US011917539B2

(12) United States Patent
Beale et al.

(10) Patent No.: US 11,917,539 B2
(45) Date of Patent: Feb. 27, 2024

(54) TERMINAL DEVICE, INFRASTRUCTURE EQUIPMENT, WIRELESS TELECOMMUNICATIONS SYSTEM AND METHODS

(71) Applicants: Sony Group Corporation, Tokyo (JP); Sony Mobile Communications Inc., Tokyo (JP)

(72) Inventors: Martin Warwick Beale, Basingstoke (GB); Shin Horng Wong, Basingstoke (GB); Brian Alexander Martin, Basingstoke (GB); Basuki Priyanto, Basingstoke (GB); Nafiseh Mazloum, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/712,287

(22) Filed: Apr. 4, 2022

(65) Prior Publication Data

US 2022/0232472 A1 Jul. 21, 2022

Related U.S. Application Data

(63) Continuation of application No. 16/610,525, filed as application No. PCT/EP2018/061179 on May 2, 2018, now Pat. No. 11,297,570.

(30) Foreign Application Priority Data

May 5, 2017 (EP) .................................... 17169835

(51) Int. Cl.
H04W 52/02 (2009.01)
H04W 28/04 (2009.01)
(Continued)

(52) U.S. Cl.
CPC ....... *H04W 52/0216* (2013.01); *H04W 28/04* (2013.01); *H04W 52/0235* (2013.01);
(Continued)

(58) Field of Classification Search
None
See application file for complete search history.

(56) References Cited

U.S. PATENT DOCUMENTS 8,886,113 B2    11/2014  Palanki
11,297,570 B2*   4/2022  Beale ................ H04W 52/0216
(Continued)

FOREIGN PATENT DOCUMENTS

CN        104521307 A       4/2015

OTHER PUBLICATIONS

International Search Report and Written Opinion dated Jul. 13, 2018 for PCT/EP2018/061179 filed on May 2, 2018, 9 pages.
(Continued)

*Primary Examiner* — Jutai Kao
(74) *Attorney, Agent, or Firm* — XSENSUS LLP

(57) ABSTRACT

A terminal device for use with a wireless telecommunications system, the terminal device configured to attempt to receive or to transmit a first signal during one or more of a plurality of predetermined time periods in response to determining that one or more second signals indicating, respectively, that the one or more of the plurality of predetermined time periods should be used for the attempted reception or transmission of a first signal have been received by the transceiver; determine a characteristic associated with the one or more second signals; and to control the transceiver to receive a third signal from the infrastructure equipment or to transmit a third signal to the infrastructure equipment, the third signal comprising information on the basis of which it is determinable whether or not a predetermined condition
(Continued)

associated with the characteristic associated with the one or more second signals has been met.

18 Claims, 11 Drawing Sheets

(51) Int. Cl.
    *H04W 68/02*     (2009.01)
    *H04W 76/20*     (2018.01)
    *H04W 76/28*     (2018.01)

(52) U.S. Cl.
    CPC ............ *H04W 68/02* (2013.01); *H04W 76/20* (2018.02); *H04W 76/28* (2018.02)

(56) References Cited

U.S. PATENT DOCUMENTS

| | | | | |
|---|---|---|---|---|
| 2018/0288735 | A1* | 10/2018 | Walldeen | H04W 4/70 |
| 2018/0302822 | A1* | 10/2018 | Yoon | H04L 47/263 |
| 2018/0310249 | A1* | 10/2018 | Wilhelmsson | H04W 52/0241 |

OTHER PUBLICATIONS

Intel Corporation, "DL Power Consumption Reduction for efeMTC," 3GPP TSG RAN WG1 Meeting No. 88bis, R1-1704693, Spokane, USA, Apr. 3-7, 2017, 6 pages.

Huawei et al., "Considerations on 'wake-up signal' for eFeMTC," 3GPP TSG RAN WG1 Meeting No. 88bis, R1-1704282, Spokane, USA, Apr. 3-7, 2017, 4 pages.

Sony, "MTC UE Power Consumption Reduction in Idle Mode Paging," 3GPP TSG RAN WG1 Meeting No. 88bis, R1-1705204, Spokane, USA, Apr. 3-7, 2017, 4 pages.

Harri Holma et al., "LTE for UMTS OFDMA and SC-FDMA Based Radio Access," 3.2 Basic System Architecture Configuration with only E-UTRAN Access Network, 2009, 4 pages.

Nafiseh Seyed Mazloum, Duty-cycled Wake-up Schemes for Ultra-low Power Wireless Communications, Lund University, 2016, 233 pages.

Sony, "Higher Data Rate for feMTC", 3GPP TSG RAN WG1 Meeting #86, Gothenburg, Sweden Aug. 22-26, 2016, R1-166660, 5 pages.

Ericsson, "New WI Proposal on Further Enhanced MTC," 3GPP TSG RAN Meeting #72, Busan, Korea, Jun. 13-16, 2016, RP-161321, 7 pages.

Ericsson, "Revised WID for Further Enhanced MTC for LTE," 3GPP TSG RAN Meeting #73, New Orleans, USA, Sep. 19-22, 2016, RP-161464, 6 pages.

Huawei, HiSilicon, "Revised work item proposal: Enhancements of NB-IoT", 3GPP TSG RAN Meeting #73, New Orleans, USA, Sep. 19-22, 2016, RP-161901, 8 pages.

Ericsson, Qualcomm, "New WID on Even further enhanced MTC for LTE," 3GPP TSG RAN Meeting #75, Dubrovnik, Croatia, Mar. 6-9, 2017, RP-170732, 4 pages.

Huawei, HiSilicon, Neul, "New WID on Further NB-IoT enhancements," #3GPP TSG RAN Meeting #75, Dubrovnik, Croatia, Mar. 6-9, 2017, RP-170852, 6 pages.

* cited by examiner

TERMINAL DEVICE, INFRASTRUCTURE EQUIPMENT, WIRELESS TELECOMMUNICATIONS SYSTEM AND METHODS

CROSS-REFERENCE TO RELATED APPLICATIONS

This application is a continuation of U.S. application Ser. No. 16/610,525, filed Nov. 4, 2019, which is based on PCT filing PCT/EP2018/061179, filed May 2, 2018, which claims priority to European Patent Application 17169835.0, filed in the European Patent Office on May 5, 2017, the entire contents of each are incorporated herein by reference.

BACKGROUND

Field of Disclosure

The present disclosure relates to terminal devices and infrastructure equipment used in wireless telecommunications systems, and to wake-up signals (WUSs) employed in the same.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the Third Generation Project Partnership (3GPP) defined Universal Mobile Telecommunications Standard (UMTS) and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network.

Furthermore such NB-IoT devices are likely to be deployed indoors and/or in remote locations making radio communications challenging. A similar class of devices is the Further Enhanced MTC (fe-MTC) [1]. Current areas of development are aimed at improving the operation of these types of low cost devices so that they are power efficient and can operate in extended coverage, such as inside basements [1][2].

One of the desires is to provide arrangements and techniques in which a power consumed by these devices can be reduced and their reduced capability can be managed.

SUMMARY OF THE DISCLOSURE

Embodiments of the present technique can provide a terminal device for use with a wireless telecommunications system. The terminal device comprising a transceiver and a controller. The controller is configured to control the transceiver to attempt to receive a first signal from infrastructure equipment of the wireless telecommunications system or to transmit a first signal to the infrastructure equipment during one or more of a plurality of predetermined time periods, the controller being configured to control the transceiver to attempt to receive or to transmit a first signal during the one or more of the plurality of predetermined time periods in response to determining that one or more second signals indicating, respectively, that the one or more of the plurality of predetermined time periods should be used for the attempted reception or transmission of a first signal have been received by the transceiver, to determine a characteristic associated with the one or more second signals, and to control the transceiver to receive a third signal from the infrastructure equipment or to transmit a third signal to the infrastructure equipment, the third signal comprising information on the basis of which it is determinable whether or not a predetermined condition associated with the characteristic associated with the one or more second signals has been met, the predetermined condition having been met indicating a discrepancy in the number of second signals transmitted by the infrastructure equipment and the number of second signals received by the terminal device.

Embodiments of the present technique, which further relate to infrastructure equipment, wireless telecommunications systems, and methods of operating and circuitry for the same, may provide ways in which the reliability of wake-up signals (WUSs), which allow for the reduction of power consumption in low power devices, can be improved between a network and a terminal device.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional LTE Technology

Figure 1:
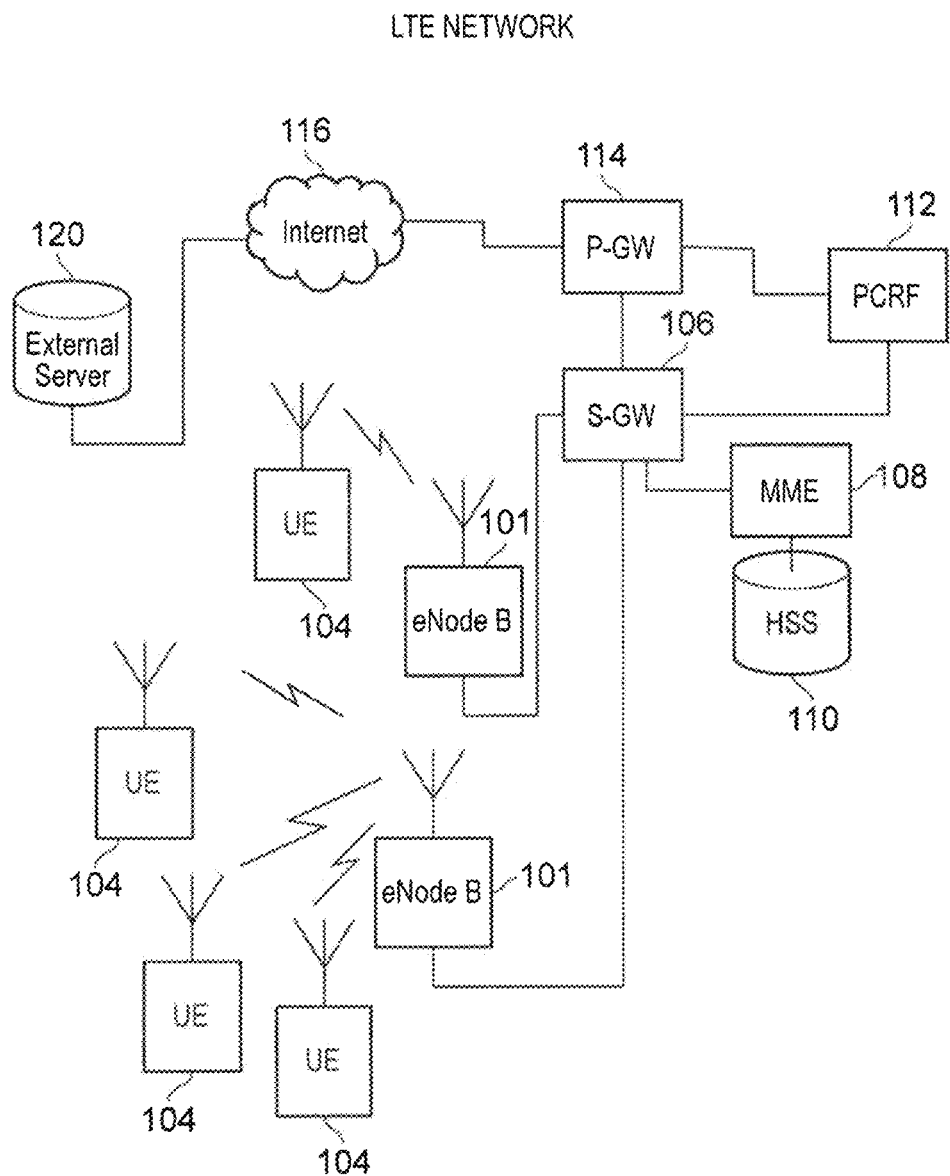
FIG. 1 provides a schematic diagram illustrating an example of a conventional mobile communications system.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [3].

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink Data is transmitted from communications devices 104 to the base stations 101 via a radio uplink. The uplink and downlink communications are made using radio resources that are licenced for exclusive use by the operator of the network 100. The core network 102 routes data to and from the communications devices 104 via the respective base stations 101 and provides functions such as authentication, mobility management, charging and so on.

Base stations, which are an example of radio network infrastructure equipment, may also be referred to as transceiver stations/NodeBs/eNodeBs (eNBs)/gNodeBs (gNBs), and so forth. Similarly the communications devices 104 may have a functionality corresponding to devices know for operation with an LTE network and may also be referred to as mobile stations, user equipment (UE), user terminal, terminal device, mobile radio, communications device, and so forth.

As shown in FIG. 1 eNodeBs 101 are connected to a serving gateway S-GW 106 which is arranged to perform routing and management of mobile communications services to the communications devices 104 as they roam throughout the mobile radio network. In order to maintain mobility management and connectivity, a mobility management entity (MME) 108 manages the enhanced packet service (EPS) connections with the communications devices 104 using subscriber information stored in a home subscriber server (HSS) 110. Other core network components include the policy charging and resource function (PCRF) 112 a packet data gateway (P-GW) 114 which connects to an internet network 116 and finally to an external server 120. More information may be gathered for the LTE architecture [1], page 25 ff.

LTE Wireless Access Interface

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. The down-link and the up-link resources allocation of a wireless access interface according to an LTE standard is presented in FIGS. 2 and 3.

Figure 2:
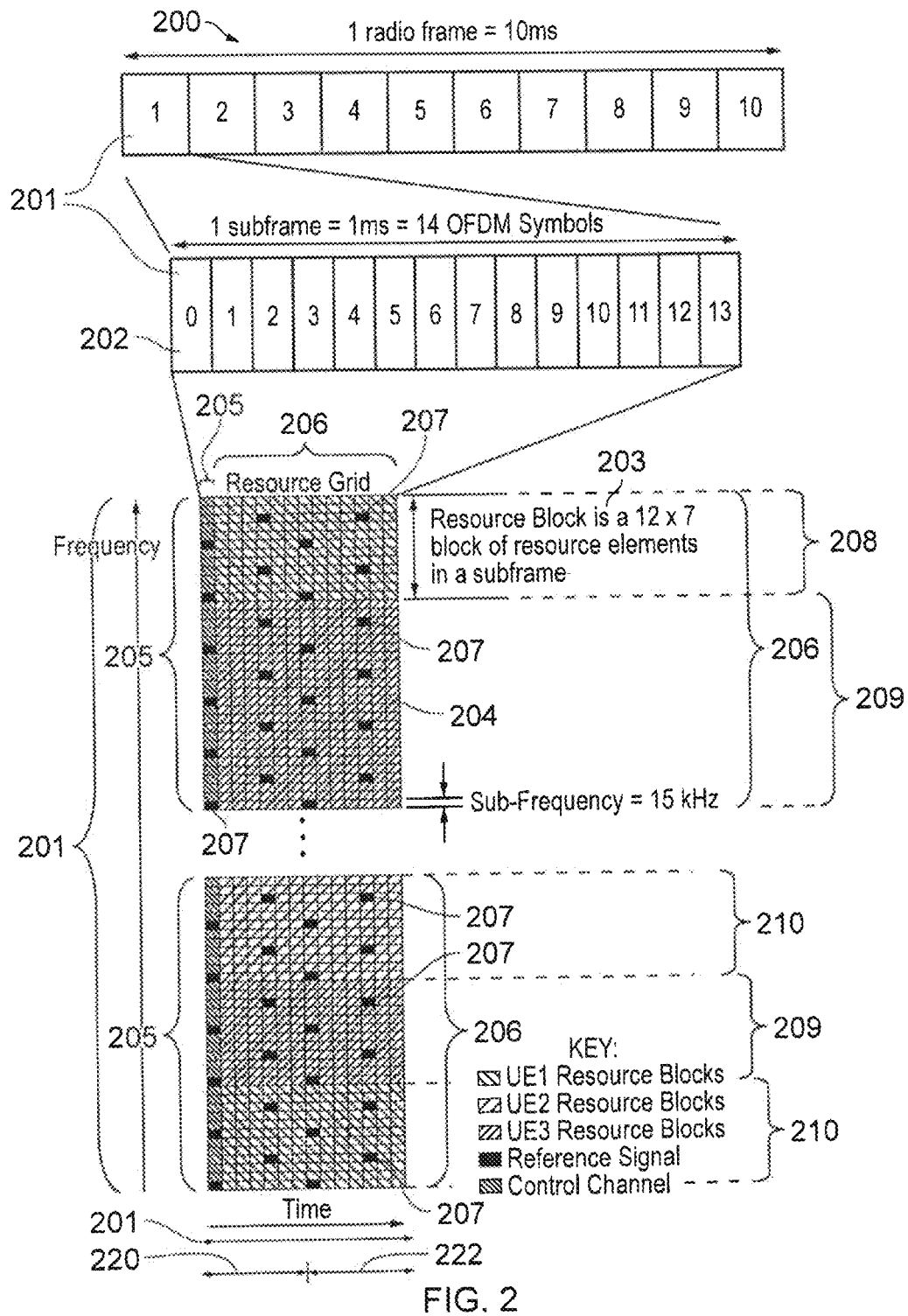
FIG. 2 provides a schematic diagram of a structure of a downlink of a wireless access interface of a mobile communications system operating according to an LTE standard.

FIG. 2 provides a simplified schematic diagram of the structure of a downlink transmission of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz.

As shown in FIG. 2, the resources of the wireless access interface are also temporally divided into frames where a frame 200 lasts 10 ms and is subdivided into 10 sub-frames 201 each within a duration of 1 ms. Each sub-frame 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. The resource elements distributed in time within a sub-frame and frequency across the host system band width represent the communications resources of the host system.

The simplified structure of the downlink of an LTE wireless access interface presented in FIG. 2, also includes an illustration of each sub-frame 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure ePDCCH and PDSCH are most relevant. Further information on the structure and functioning of the physical channels of LTE systems can be found in [3].

Figure 3:
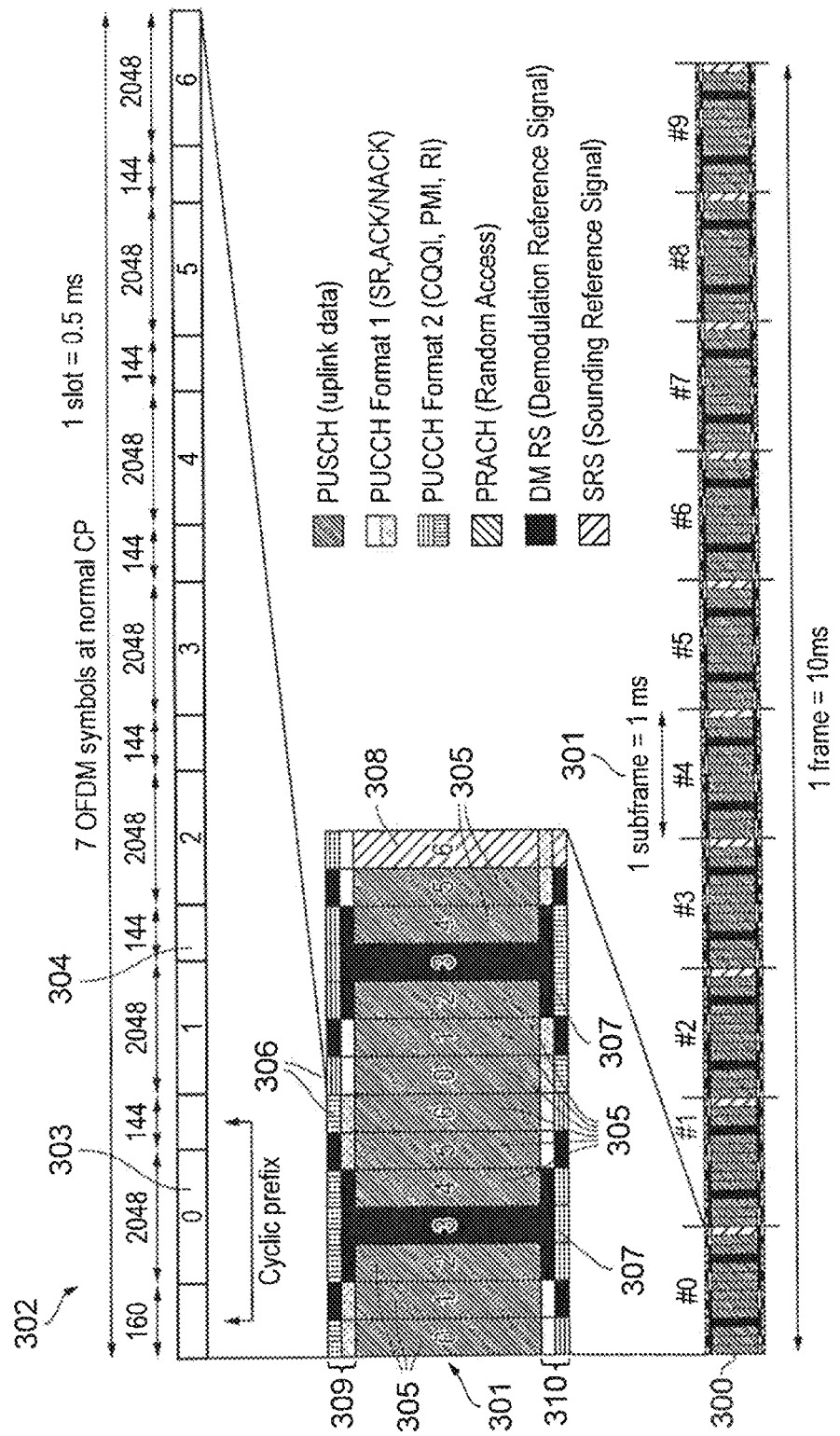
FIG. 3 provides a schematic diagram of an uplink of a wireless access interface of a mobile communications system operating according to an LTE standard.

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 3, UE1 has been allocated resources 208 of the data region 206, UE2 resources 209 and UE3 resources 210. UEs in an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

Figure 4:
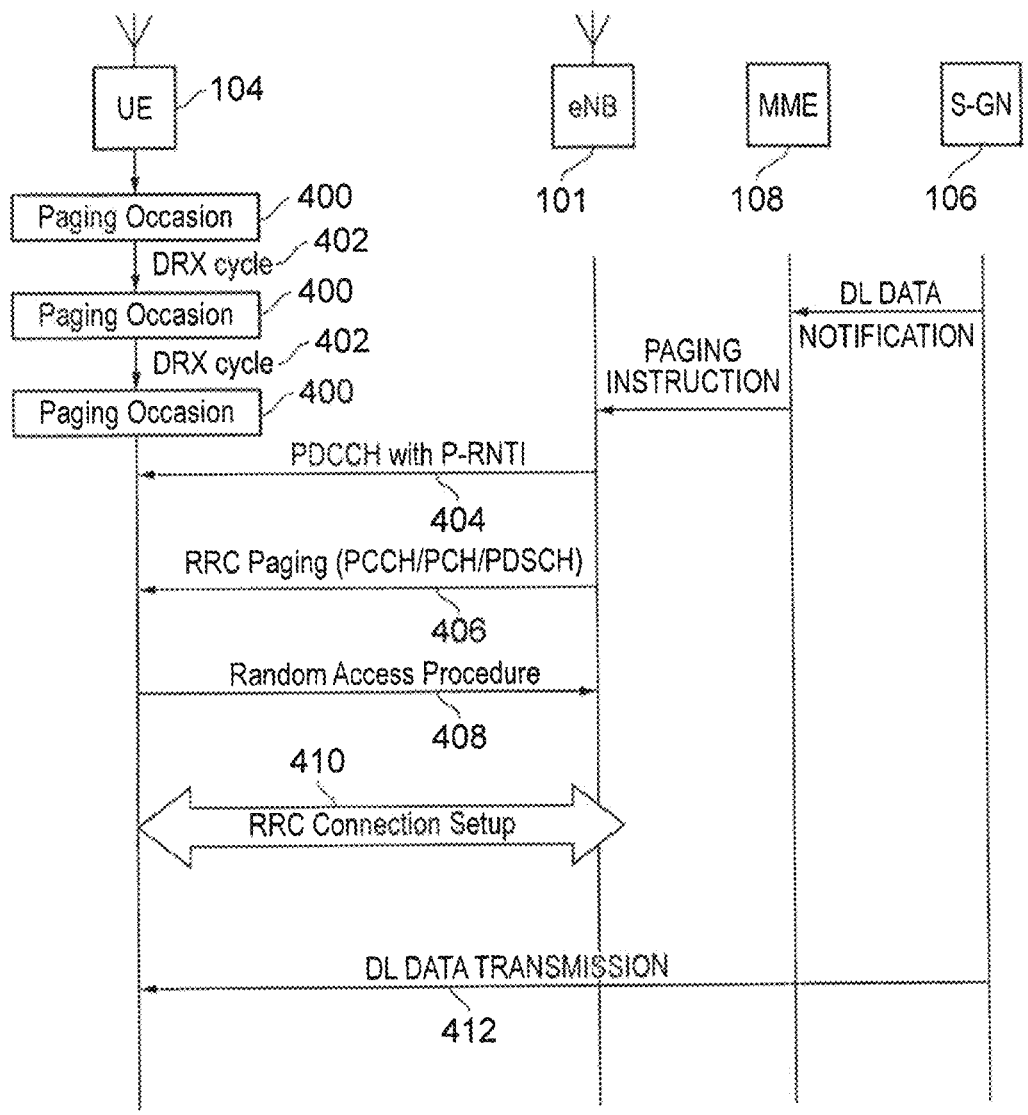
FIG. 4 provides a message sequence diagram and part schematic diagram providing a simplified representation of a paging procedure for a conventional system.

FIG. 3 provides a simplified schematic diagram of the structure of an uplink transmission of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 4 illustrates such an uplink frame in an FDD implementation. A frame 300 is divided in to 10 sub-frames 301 of 1 ms duration where each sub-frame 301 comprises two slots 302 of 0.5 ms duration. Each slot is then formed from seven OFDM symbols 303 where a cyclic prefix 304 is inserted between each symbol in a manner equivalent to that in downlink sub-frames. More details of the LTE up-link represented in FIG. 3 are provided in Annex 1.

Conventional Downlink Data Transmission

In order to provide a better appreciation of the embodiments described in the following paragraphs a conventional downlink transmission of data after a paging process will be briefly described. To transmit data to a communications device (UE), it is necessary to locate a UE within a wireless communications network and to establish a connection with the UE for transmitting the data to the UE. A process for establishing a connection with a UE includes a paging procedure, which informs the UE that the network has data to transmit to it so that the UE should enter an active state and establish a connection. To this end, a paging message is transmitted to the UE as part of the paging procedure. A summary of the paging procedure for LTE can be found in [4].

FIG. 4 provides a simplified representation of a paging procedure according to that which is currently proposed within LTE. As shown in FIG. 4 paging occurs when data is to be transmitted to a UE 104 on the downlink. The data is received at the network and forwarded to the serving gateway 106. The serving gateway 106 then sends a downlink data notification that it has downlink data to send to a UE to the MME 108. As explained above the MME 108 is responsible for mobility management for the UEs and therefore is aware of a current location of each UE within an area comprising a plurality of eNodeBs. The MME 108 then sends a paging instruction to a group of eNodeBs in the area in which the UE is located, including the eNodeB 101 to which the UE 104 is currently attached. The eNodeB 101 then proceeds to transmit a paging message to the UE.

As those acquainted with LTE will appreciate the LTE standard provides a technique in which UEs can perform discontinuous reception (DRX) in order to save battery power. Discontinuous reception allows the UE to reduce power to its receiver because according to the system specification a paging message will not be sent to a UE for a predetermined time. However, according to the specification the UEs are configured to "wakeup" and power up its receiver at each paging occasion in order to receive a paging message which may be transmitted to the UE from an eNodeB. The time at which a UE wakes up and powers up its receiver to receive a paging message from the eNodeB is referred to as a "paging occasion". Thus as shown in FIG. 4 the UE 104 periodically powers up its receiver at the predetermined paging occasions 400. As also shown in between, the UE powers down its receiver according to its DRX cycle 402. Likewise the eNodeB will only transmit a paging message for that UE in the paging occasions 400 for that UE.

As shown in FIG. 4 when a paging occasion occurs for the UE, the eNodeB 101 transmits in the PDCCH for the UE a paging identifier known as a paging-radio network temporary identifier (P-RNTI). The UE receives the P-RNTI from the PDCCH which also provides an indication of the communications resources of, for example, the shared channel (PCCH/PCH/PDSCH) in which the paging message will be transmitted. Therefore at step 406 the eNodeB 101 transmits an RRC paging message within the communications resources of the PDSCH, which have been indicated by the PDCCH in message 404. If the UE 104 detects an identifier of that UE which is received within the paging message transmitted on the shared communications resources (PDSCH) 406, then the UE 104 performs a random access procedure 408 in order to request downlink communications resources from the eNodeB 101. There then follows an RRC connection setup exchange of messages 410 which establishes an RRC connection with the UE 104 so that the downlink data can be transmitted to the UE in communications represented by an arrow 412.

Transmission of Configuration Information

Wireless communications networks can be provided with a facility for broadcasting configuration information to UEs for the UEs to perform network controlled functions. Those acquainted with LTE will appreciate that such configuration information is referred to as system information or other broadcast configuration messages such as SC-MCCH. The system information is transmitted to UEs from a serving eNodeB. System information is transmitted to UEs to provide the UEs with a configuration to perform various functions to transmit and receive data from within a cell formed by the eNodeB. The system information includes a master information block (MIB) and a number of system information blocks (SIB). The MIB is broadcast on a physical broadcast channel (PBCH) of the wireless access interface while the SIBs are transmitted on the PDSCH through radio resource control (RRC) messages. Conventionally the transmission of the SIB in the PDSCH is signalled to the UE by transmitting a control message in the PDCCH (control channel) The MIB is the first thing which the UE detects and allows the UE to achieve downlink synchronisation. The MIB carries the most essential information that is needed for the UE to acquire other information from the cell and includes for example a downlink channel bandwidth, a system frame number and the eNodeBs transmit antenna configuration. The first SIB1 carries information related to the cell in which the UE is operated in order for the UE to access the cell and defines the schedules for the other SIBs. There are various other SIBs which are specified within LTE standards.

Figure 5:
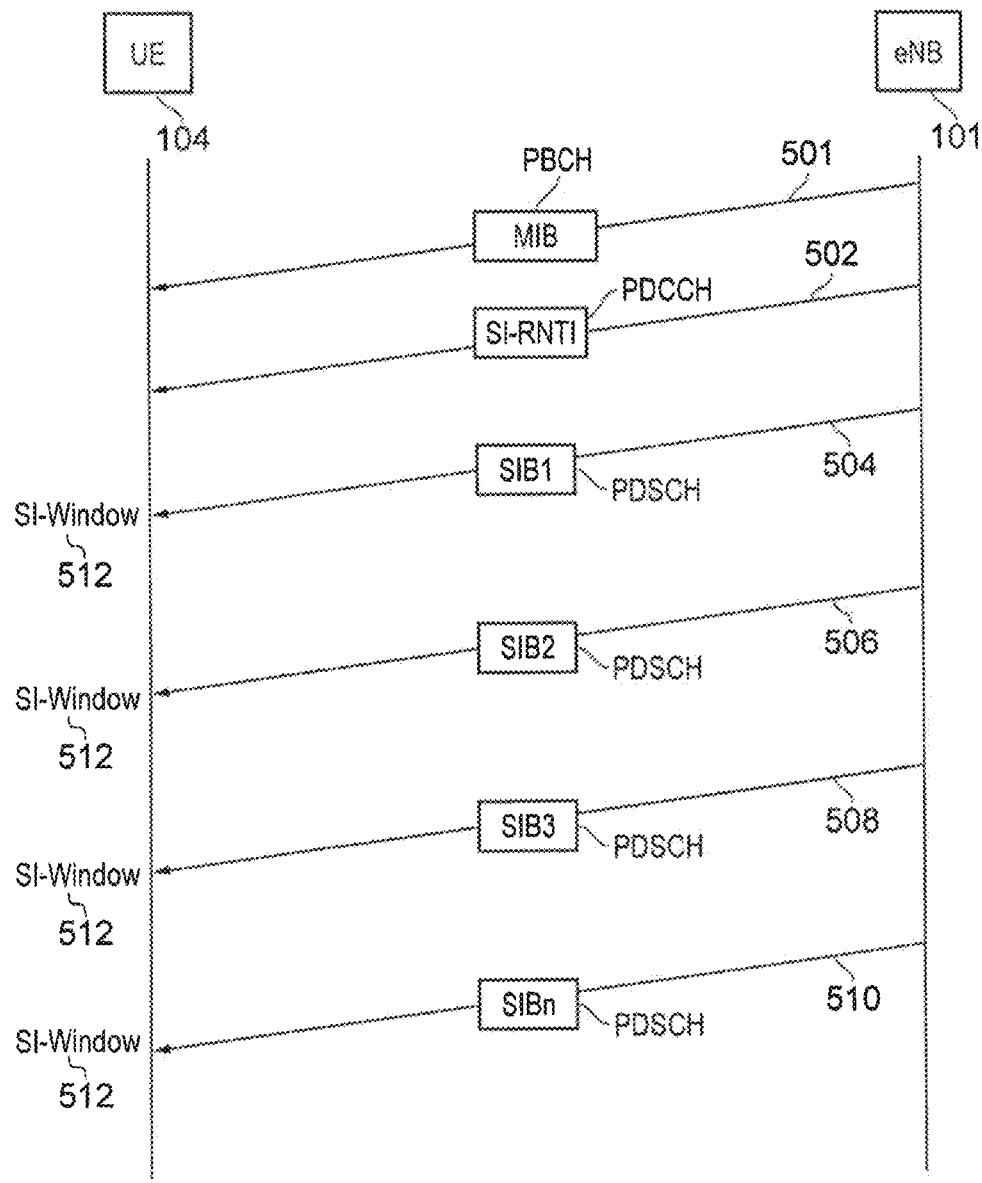
FIG. 5 provides a message sequence diagram illustrating a transmission of system information blocks (SIBs) providing configuration information to communications device.

An illustration of the communication of the SIBs to a UE is shown in FIG. 5. In FIG. 5 a message flow diagram is shown between an eNodeB 101 and a UE 104. As can be seen the first system information is transmitted in the MIB which is transmitted in the PBCH represented by an arrow 501. The UE then detects an SI-radio network temporary identifier (RNTI) transmitted in the PDCCH 502 which communicates corresponding scheduling of the other SIBs. The scheduling of the transmission of the SIBs is within system information windows (SI windows) which occur periodically so that the SIBs are each transmitted in accordance with a predetermined time interval so that the UEs can detect the system information transmitted in each of the SIBs. As shown in FIG. 5 each of the SIB 1, SIB 2, SIB 3 and generically SIBn are transmitted in the PDSCH as represented by arrows 504, 506, 508, 510. The SIBs are each transmitted within an SI window 512 in accordance with a schedule signalled by the SI-RNTI transmitted in the PDCCH 502. As shown in FIG. 5 a PDCCH transmission 502 for receiving the SIB1 504, and it will be appreciated that according a conventional arrangement a PDCCH transmission, which includes the SI-RNTI would be made in order to receive each of the SIBs 504, 506, 508, 510.

Figure 6:
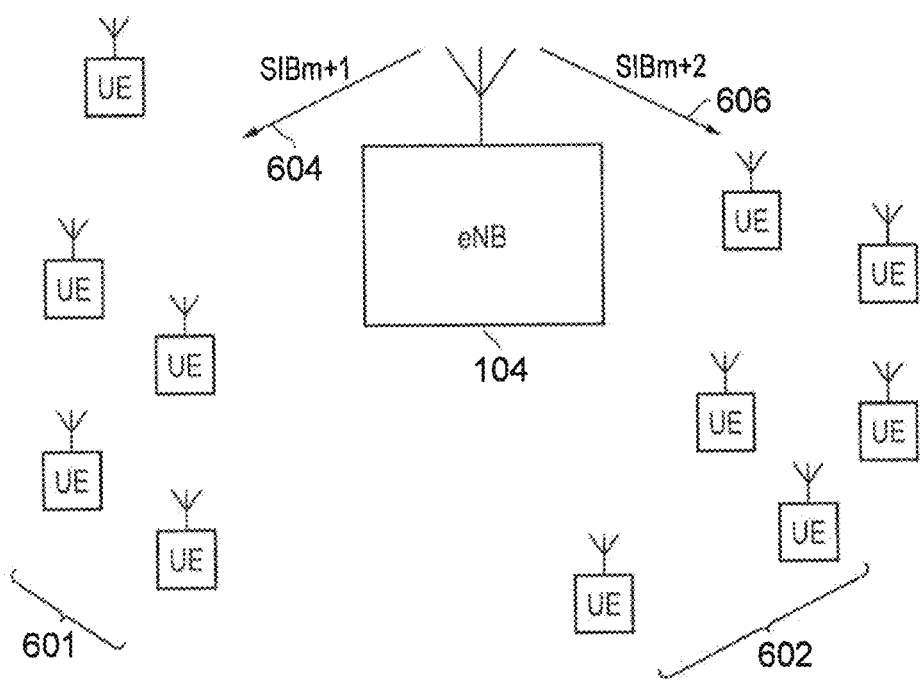
FIG. 6 is a schematic representation illustrating different groups of communications device which are differently configured.

As illustrated in FIG. 6 the eNodeB 104 may serve different groups of UEs 601, 602 which each may be configured in accordance with a different function or arranged to provide a different service to a user. Indeed a first group of the UEs 601 may be configured to operate in accordance with a different LTE standard to a second of the groups of UEs 602. Accordingly, some system information may be relevant to one group and not the other. Accordingly, as illustrated by two arrows 602, 606, the first group may receive system information in a SIBm+1 604 which may not be relevant to the second group of UEs 602. The second group of the UEs may receive system information in a system information block SIBn+2 transmitted to the second group of UEs as represented by the arrow 606 which may not be relevant to the first group of UEs 601.

Single Cell Point to Multipoint (SC-PTM) Transmission

Single Cell Point to Multipoint (SC-PTM) transmission is a multicast transmission at the cell level where user data is broadcasted to multiple UEs in the cell. This network controlled function is useful to transmit data that is common to groups of UEs such as software downloads. Different data services can be multicast to different groups of UEs, for example one group of UEs may be performing software updates and another group can be receiving video broadcasts. In current LTE standards, SC-PTM utilises two types of logical channels, namely the SC-MCCH (Single Cell Multicast Control Channel) and the SC-MTCH (Single Cell Multicast Traffic Channel) The SC-MCCH provides information on the data services available and where each data service is carried by a SC-MTCH. SC-MCCH and SC-MTCH messages are carried by the PDSCH, which is scheduled by PDCCH.

Figure 7:
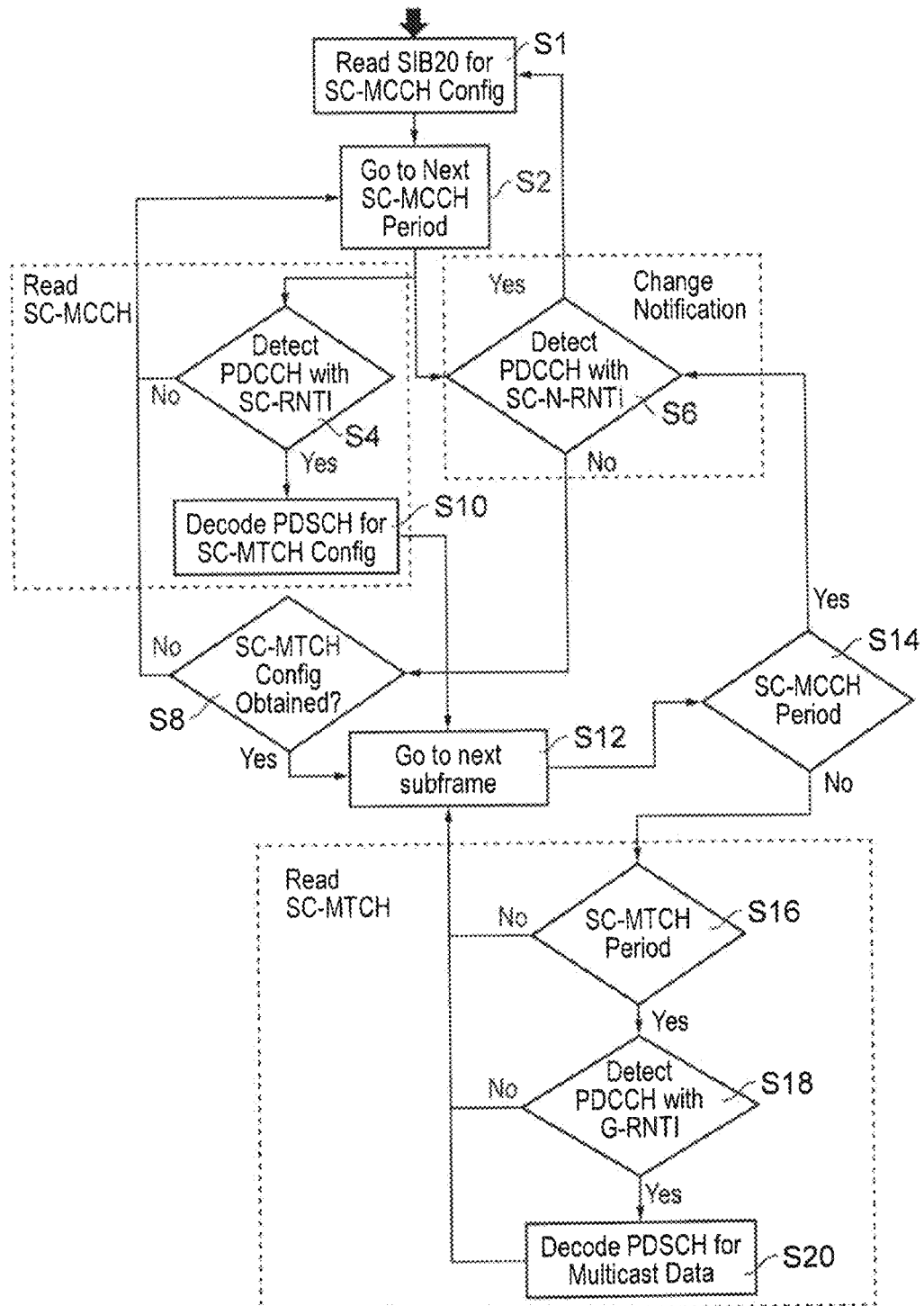
FIG. 7 is a flow diagram representing a process followed by a communications device (UE) when performing a single cell-point to multipoint communications service (SC-PTM)

An example of SC-PTM transmission procedures is shown in the flow diagram of FIG. 7. As shown in FIG. 7, a first step S1 the UE detects system information relating to the SC-PTM service by receiving SIB 20. The SIB 20 provides configuration information relating to a configuration of the SC-MCCH, for example periodicity and modification period in respect of how often the SC-MCCH can be changed.

In step S2 the UE waits for the next SC-MCCH period to detect either an SC-RNTI or and SC-N-RNTI. That is, the UE blind decodes the PDCCH using SC-RNTI during the SC-MCCH period for a possible SC-MCCH message. As shown in steps S4 and S6 respectively, the UE determines whether or not it has read either the SC-RNTI or the SC-N-RNTI. The SC-N-RNTI indicates whether there has been a change in the system information associated with the SC-PTM service. At a certain point S6 therefore, the UE determines whether a change has occurred in the SC-PTM service. If a change has occurred then the UE is configured to receive the SIB 20 information which configures the SC-MCH. If no change has occurred then the UE proceeds to decision step S8.

In step 4 if the UE detects the SC-RNTI then it proceeds to step S10 to decode the PDSCH for the SC-MTCH configuration in step S10 and proceeds to step S12 in which it goes to the next sub frame. The UE then monitors the SC-MCCH period and if detected at step S14 then the UE proceeds to step S6 to again detect whether the SC-N-RNTI is present in the PDCCH. Otherwise the UE proceeds to steps S16 to determine whether the SC-MTCH period has been reached and if so in step 18 to detect the PDCCH with the G-RNTI to identify the resources of the PDSCH for receiving the multicast data service. After receiving the multicast data the UE proceeds back to the step S12 and goes to the next sub frame and correspondingly if the SC-MTCH period has not expired in step S16 or the G-RNTI is not detected in step S18 then processing proceeds back to step S12. In step S8, if the SC-MTCH configuration has not been obtained then processing proceeds back to step S2.

Accordingly, FIG. 7 provides a flow diagram in which a configuration of the SC-PTM service is provided via the SIB 20 following which a procedure is followed in which between periods of SCMCCH, an SC-RNTI or SC-N-RNTI is detected on the conventional PDCCH and if so processing proceeds to acquire the multicast data from the SC-MTCH. Accordingly within a cell, an eNodeB may transmit multicast data to a plurality of UEs or groups of UEs which have been configured to receive data in accordance with SC-PTM.

The SC-PTM is one example of a service which is configured by a SIB (SIB20). However the multicast data services are expected to change and hence the SC-MCCH containing configuration of these services and the SC-MCCH configuration itself can also change. Such a change is indicated during the SC-MCCH period via a DCI with CRC scrambled by SC-N-RNTI transmitted by the PDCCH. When the UE detects a PDCCH with SC-N-RNTI, it would re-read SIB20 to obtain new SC-MCCH configurations and then re-read SC-MCCH for new SC-MTCH configurations (or SC-MTCH configuration for the multicast data service of interest).

For low cost and low power UEs it is desirable to provide the SC-PTM service when the UE is in an idle mode. Such an arrangement finds application with 3GPP LTE standards concerning feMTC (Further Enhanced Machine Type Communications) [5] and eNodeB-IoT (Enhanced Narrowband Internet of Things) [6]. In Idle mode the UE performs discontinuous reception (DRX) as explained above DRX with a DRX period equal to the UE's Paging Occasion. In order to track for any possible changes to the SC-PTM services, in addition to the Paging Occasion, the UE also needs to power up during SC-MCCH period to detect for PDCCH using SC-N-RNTI, which would consume additional UE power. Recognising that battery life is an important feature of low power UEs and that the multicast services are unlikely to change very often, compared to non-MTC multicast services, it is proposed to remove the need for SC-N-RNTI and instead use the existing system information change notification. The system information change notification is to indicate to UEs that there is a change in the SIB, where the eNodeB would transmit a paging message indicating system information modification to trigger the UEs to re-read all the SIBs.

It should be noted that reading the entire SIBs, and even receiving paging message on PDSCH, consumes a lot of UE battery power and using SI change notification due to a change in a single SIB, i.e. SIB20, for SC-PTM would not be efficient.

As explained above with reference to FIG. 6, it is expected that UEs which are configured to operate in accordance with different LTE standards such as eNB-Internet of Things (IoT) and Further Enhanced Machine Type Communications (feMTC), in for example LTE Release-14 standards will be deployed into a network that also serves UEs which are configured to operate in accordance with earlier versions of the standard (legacy UEs), for example UEs configured in accordance with Release-13 (eNB-IoT and feMTC).

efeMTC and feNB-IoT

Following on from feMTC [5] and eNB-IoT [6], proposals have been made to further enhance the IoT in 3GPP by introducing two additional Rel-15 WIs, namely efeMTC (Even Further Enhanced Machine Type Communications) [7] and feNB-IoT (Further Enhanced Narrowband Internet of Things) [8].

Figure 8:
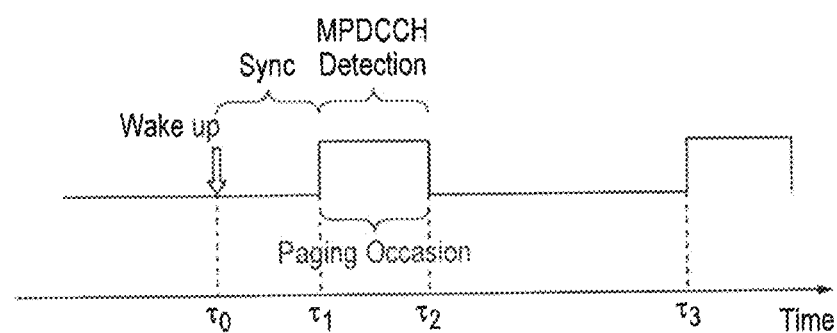
FIG. 8 shows a paging occasion example in Rel-14 MTC.

In legacy systems, i.e. Rel-14 feMTC and Rel-14 eNB-IoT, the UE performs DRX in idle mode where the UE is required to monitor for possible paging messages at every paging occasion. FIG. 8 shows a paging occasion cycle where the paging occasion starts at time $\tau_1$ and the UE is expected to blind detect for any potential MPDCCH (i.e. MPDCCH with a P-RNTI) between time $\tau_1$ and $\tau_2$. Typically the UE needs to wake up prior to the paging occasion, i.e. at time $\tau_0$ to perform synchronisation especially after a very long DRX where the UE loses sync (where synchronisation can include fine adjustment to frequency and timing tracking loops using CRS for when DRX cycles are short to re-synchronisation using PSS/SSS and CRS when DRX cycles are long and the frequency and timing of the UE is significantly offset relative to that of the eNodeB). If there is a paging message, the UE will decode the PDSCH carrying this paging message after time $\tau_2$. However, if there is no paging message for the UE, then the UE will go back to sleep until the next paging occasion at time $\tau_3$. It can be observed that if there is no paging message, the UE uses up a lot of energy waking up prior to the paging occasion, synchronizing to the network and performing blind detection of MPDCCH. It is expected that paging will not occur very often for MTC devices and will be rare (e.g. once a day) for utility meters. Hence, a lot of energy will be wasted performing unnecessary synchronisation, blind MPDCCH detections, and overhearing paging messages that belong to other UEs.

Figure 9:
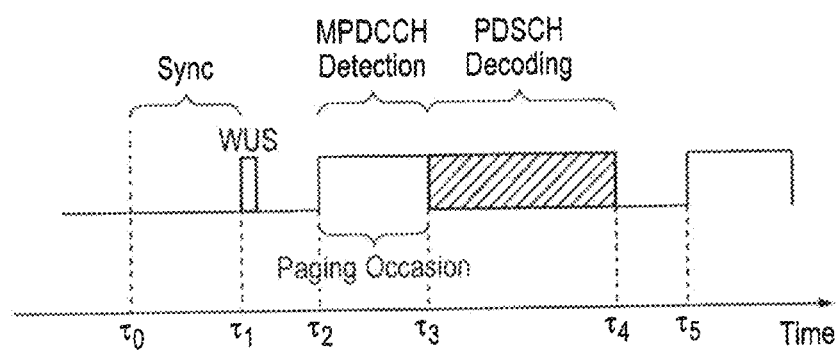
FIG. 9 shows an example of a WUS transmission.

Rel-15 efeMTC and Rel-15 feNB-IoT share several common objectives, one of which is to reduce power consumption with the introduction of a Wake Up Signal (WUS). The WUS is a new physical channel containing very little information (e.g. UE ID or group ID) and so can be decoded very quickly (as compared to blind decoding for MPDCCH). The WUS can also be encoded with a format that enables low power decoding (e.g. the WUS may be a narrow bandwidth signal that can be decoded with low power using a low sampling rate receiver). The WUS is transmitted prior to a paging occasion as shown in FIG. 9 at time $\tau_1$, only when there is an MPDCCH transmission in that paging occasion. Here, upon detection of a WUS, the UE will proceed to fine tune its frequency and timing tracking loops if required and blind detects for a MPDCCH between time $\tau_2$ and $\tau_3$ followed by decoding of the PDSCH carrying the paging message between time $\tau_2$ and $\tau_3$. If the UE fails to detect a WUS, it will go back to sleep and skip detecting for MPDDCH. Hence, by using WUS, the UE will consume less energy by avoiding unnecessary monitoring of MPDCCH. It should be appreciated that WUS can also be used in connected mode when DRX is used.

The WUS can be UE-specific, group-specific or broadcast:

UE-specific-WUS addresses a specific UE. The UE only wakes up if it receives its address in the WUS.

Group-WUS addresses a group of UEs at the paging occasion (e.g. all UEs with IMSI mod 2=0 may belong to a first WUS group and UEs with IMSI mod 2=1 may belong to a second WUS group).

Broadcast-WUS addresses all UEs that are potentially active at the paging occasion.

There are some reliability issues with the use of a WUS:

Missed detection—If the UE does not detect the WUS, it does not turn on during a paging occasion and cannot be paged. The network will need to page the UE again at a future time. This is wasteful of air interface resources and increases the latency of paging the UE.

False alarm—If the UE detects WUS when WUS was not transmitted, the main UE receiver is woken up for no reason and UE power consumption is increased.

Security attack to waste UE battery—A malicious attacker sends WUS in order to wake the UE up when it shouldn't have been woken up. This wastes UE battery resources.

Security attack to make the UE unreachable—A malicious attacker jams the WUS. Since the UE does not receive the WUS, it does not wake up and is hence unreachable while the attack continues.

Hence a WUS can reduce reliability of communication (paging messages and other messages that are controlled by the WUS) between the network and the UE. Embodiments of the present technique aim to mitigate this reduction in reliability.

DRX Cycles for WUS and WUS Reliability Monitoring

Embodiments of the present technique generally relate to counting by the UE of the number of times it has received a WUS, and subsequently comparing that to the number of times the eNodeB actually transmitted the WUS. If there is a discrepancy, then the network takes an action to improve the reliability of communication with the UE.

Figure 10:
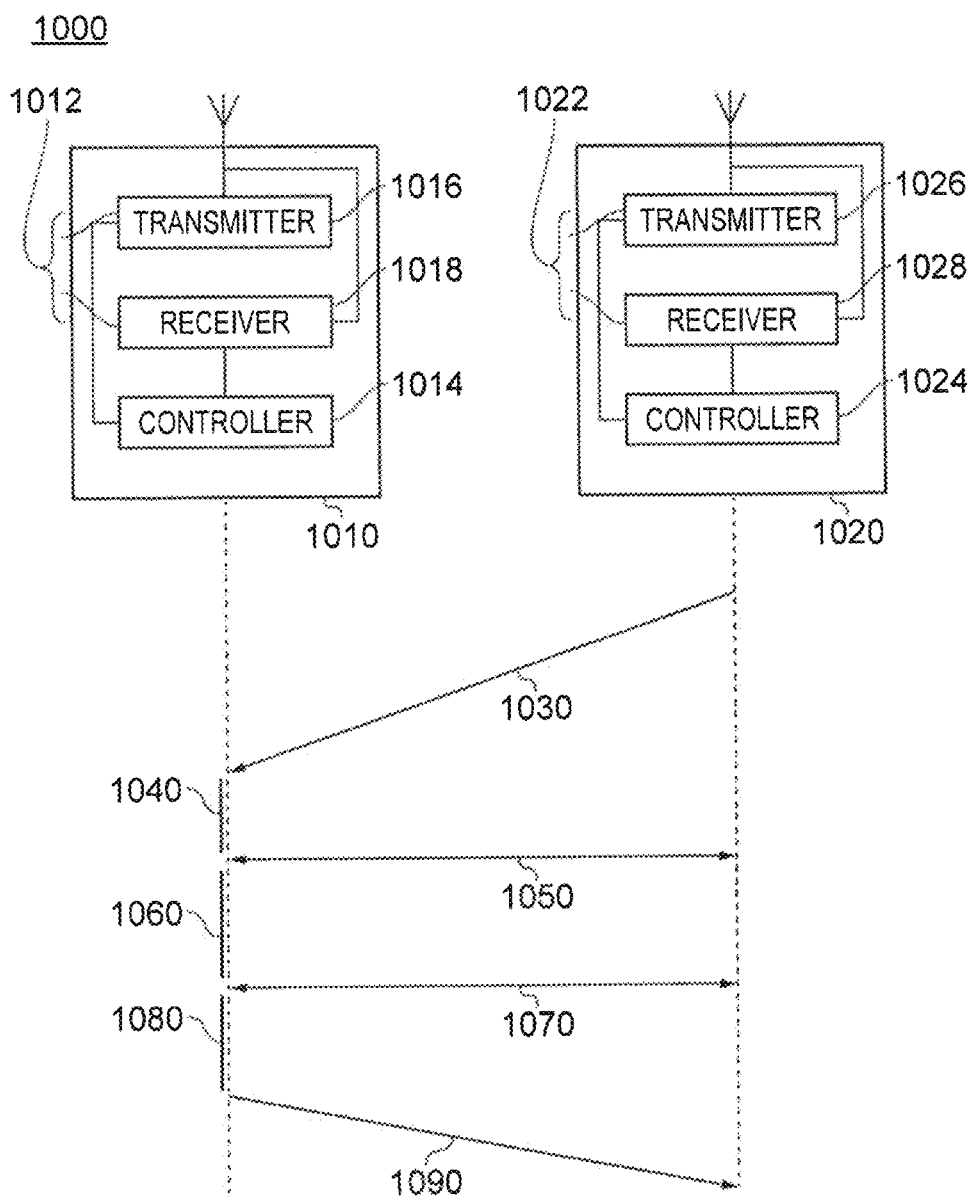
FIG. 10 is a part schematic representation, part message flow diagram of communications between a terminal device and an infrastructure equipment of a wireless telecommunications network in accordance with embodiments of the present technique.

Embodiments of the present technique, as illustrated by FIG. 10, provide both a terminal device and an infrastructure equipment for use with a wireless telecommunications system 1000. Each of the terminal device 1010 and the infrastructure equipment 1020 comprise a transceiver 1012, 1022 and a controller 1014, 1024. The controller 1014 of the terminal device 1010 is configured to control the transceiver 1012 to attempt to receive 1050 a first signal from infrastructure equipment 1020 of the wireless telecommunications system 1000 or to transmit 1050 a first signal to the infrastructure equipment 1020 during one or more of a plurality of predetermined time periods, the controller 1014 being configured to control the transceiver 1012 to attempt to receive or to transmit 1050 a first signal during the one or more of the plurality of predetermined time periods in response to determining 1040 that one or more second signals indicating, respectively, that the one or more of the plurality of predetermined time periods should be used for the attempted reception or transmission of a first signal have been received 1030 by the transceiver 1012, to determine 1060 a characteristic associated with the one or more second signals, and to control the transceiver 1012 to receive 1070 a third signal from the infrastructure equipment 1020 or to transmit 1070 a third signal to the infrastructure equipment 1020, the third signal comprising information on the basis of which it is determinable whether or not a predetermined condition associated with the characteristic associated with the one or more second signals has been met, the predetermined condition having been met indicating a discrepancy in the number of second signals transmitted by the infrastructure equipment 1020 and the number of second signals received by the terminal device 1010. When the predetermined condition is determined 1080 to have been met, the controller 1014 is configured to take a predetermined action 1090 in response to the discrepancy in the number of second signals transmitted by the infrastructure equipment 1020 and the number of second signals received by the terminal device 1010.

Each of the terminal device 1010 and the infrastructure equipment 1020 comprise the transceiver (or transceiver circuitry) 1012, 1022 which in turn comprises one or both of a transmitter (or transmitter circuitry) 1016, 1026 and a receiver (or receiver circuitry) 1018, 1028, and the controller (or controller circuitry) 1014, 1024. Each of the controllers 1014, 1024 may be, for example, a microprocessor, a CPU, or a dedicated chipset, etc.

In some embodiments, the controller is configured to control the transceiver to receive or transmit the third signal from or to the infrastructure equipment in response to the determination of the characteristic associated with the one or more second signals. Alternatively, this may be triggered separately (for example as a UE information request sent to report an aspect of the reliability of reception of the second signal, e.g. a count of the number of times that the second signal has been received).

In some embodiments of the present technique, there is a first DRX cycle that is controlled by WUSs. A second DRX cycle is not controlled by WUSs. The UE always wakes up at the second DRX cycle's DRX_on times. The UE counts the number of WUSs received during the second DRX cycle. In a message transmitted during the DRX_on time of the second DRX cycle, the eNodeB signals the number of WUSs it transmitted during that cycle. If there is a discrepancy in the number of WUSs, the UE signals that discrepancy to the network. The discrepancy can either be signalled in a unicast manner to the network or can be signalled by a common resource (e.g. a known PRACH preamble).

Unicast—the UE would PRACH to the network to be assigned PUSCH and then transmit the discrepancy report to the eNodeB in that PUSCH. The unicast report is suitable for a unicast WUS, but can also be used for group WUSs.

Common—any UE that had a discrepancy between the measured number of WUSs and the transmitted number of WUSs would send a known PRACH preamble in a known resource. If the eNodeB receives this known PRACH preamble, it knows that there is a reliability problem for at least one UE in the group that is controlled by the WUS and can take measures to improve the reliability. This report is suitable for a group WUS or broadcast WUS.

Figure 11:
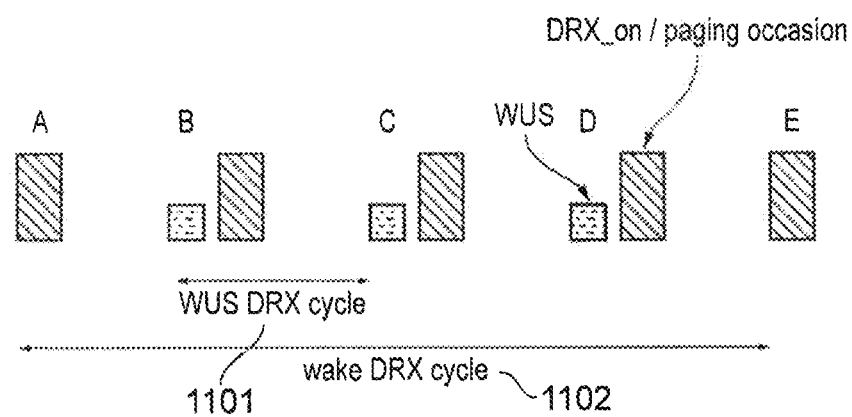
FIG. 11 shows a first example of WUS operation, with two DRX cycles, in accordance with embodiments of the present technique.

A first example of this operation is illustrated in FIG. 11. FIG. 11 shows:

A first DRX cycle 1101, labelled WUS DRX cycle. The UE only receives during the DRX_on/paging occasions if the WUS is active during this DRX cycle.

A second longer DRX cycle 1102, labelled wake DRX cycle. The UE always wakes up to monitor for messages from the network at the periodicity of this DRX cycle regardless of the presence/absence of WUSs.

Below is described the operation at points A to E:

A, E: At the ends of the DRX cycle, the eNodeB transmits an indication of the number of WUSs transmitted during that wake DRX cycle 1102. In the example shown, the eNodeB indicates that 3 WUSs were transmitted during the wake DRX cycle.

B, C, D: The UE monitors WUSs and increments a counter if it receives WUSs.

E: The UE compares the number of WUSs that it received to the number that was transmitted and if there is a discrepancy, it signals that discrepancy to the network.

Figure 12:
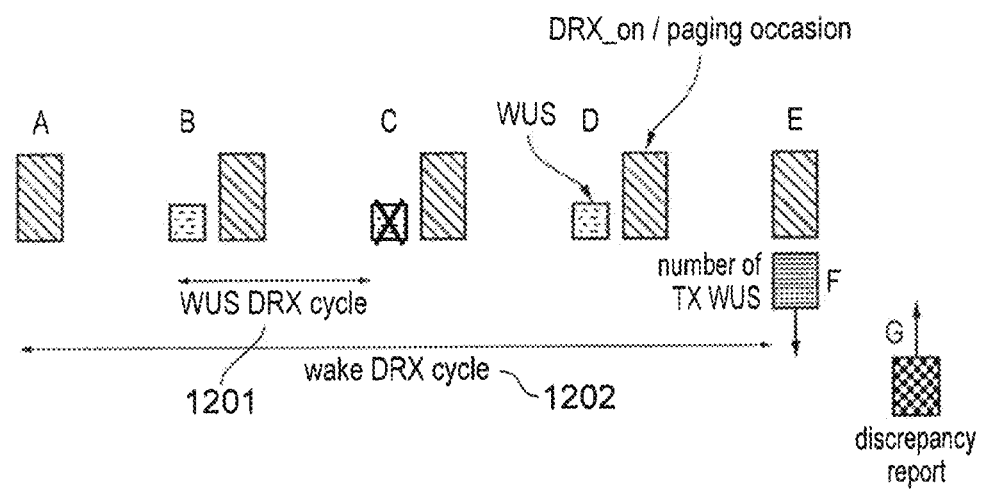
FIG. 12 shows a second example of WUS operation, with two DRX cycles, in accordance with embodiments of the present technique.

A second example of the operation is illustrated in FIG. 12, which again has a WUS DRX cycle 1201 and a wake DRX cycle 1202. FIG. 12 shows, at points A to G:

A: UE resets its WUS counter. eNB counter=0, UE counter=0

B: eNB transmits WUS, UE receives it. eNB counter=1, UE counter=1

C: eNB transmits WUS, UE does not receive it. eNB counter=2, UE counter=1

D: eNB transmits WUS, UE receives it. eNB counter=3, UE counter=2

E: UE wakes up at end of wake DRX cycle.

F: eNB sends a message indicating the number of transmitted WUSs (it indicates "3" in this example)

G: UE receives the message containing the indication of the number of transmitted WUSs ("3") and observes that this is different to the number of received WUSs ("2"). Due to the discrepancy, the UE sends a discrepancy report to the eNodeB.

Later: eNodeB takes remedial action on WUS transmission (e.g. transmits WUSs with a higher transmit power).

It should also be appreciated that the $2^{nd}$ wake DRX cycle can be used to counter a poorly transmitted WUS. If the WUS is received at a low SNR due to poor configuration (e.g. not sufficient repetitions, where repetitions can be used to improve the coverage of the WUS) the UE may consistently fail to decode it and the eNodeB may have difficultly reaching this UE. The $2^{nd}$ wake DRX cycle is an opportunity to reach the UE since the UE will wake up regardless of the presence or absence of WUSs, and give an opportunity for the network to reconfigure the WUSs for this UE (e.g. increase preamble length or repetition).

In other words, in these embodiments of the present technique, the characteristic associated with the one or more second signals is the number of second signals received by the transceiver and the predetermined condition is that there is a discrepancy in the number of second signals received by the transceiver and the number of second signals transmitted by the infrastructure equipment. The controller is configured to control the transceiver to receive the third signal from the infrastructure equipment, the third signal indicating the number of second signals transmitted by the infrastructure equipment and to compare the number of second signals received by the transceiver with the number of second signals transmitted by the infrastructure equipment as indicated by the third signal in order to determine whether there is a discrepancy in the number of second signals received by the transceiver and the number of second signals transmitted by the infrastructure equipment.

When it is determined that there is a discrepancy in the number of second signals received by the transceiver and the number of second signals transmitted by the infrastructure equipment, the predetermined action comprises controlling the transceiver to transmit a fourth signal to the infrastructure equipment, the fourth signal indicating that a discrepancy has been detected. When it is determined that there is a discrepancy in the number of second signals received by the transceiver and the number of second signals transmitted by the infrastructure equipment, the predetermined action comprises controlling the transceiver to attempt to receive a first signal from the infrastructure equipment or to transmit a first signal to the infrastructure equipment during each of the plurality of predetermined time periods.

The plurality of time periods occur periodically at a first periodic frequency, and the controller is configured to control the transceiver to attempt to receive the third signal during ones of the plurality of time periods at a second periodic frequency, the second periodic frequency being less than the first periodic frequency. Alternatively, the plurality of time periods occur periodically at a first periodic frequency, and the controller is configured to control the transceiver to attempt to receive the first signal during ones of the plurality of time periods at a third periodic frequency, the third periodic frequency being less than the first periodic frequency.

In some of these embodiments, a first signal received by the transceiver from the infrastructure equipment during one of the plurality of predetermined time periods comprises the third signal.

In some embodiments of the present technique, when the network successfully contacts the UE via the WUS/paging/DRX_on mechanism, the network and UE compare the number of WUSs received by the UE to the number transmitted by the eNodeB (e.g. the paging response message from the UE includes an indication of the number of WUSs received by the UE and this is compared to the known number of WUSs transmitted by the eNodeB). If there is a discrepancy, the eNodeB can take remedial action.

Figure 13:
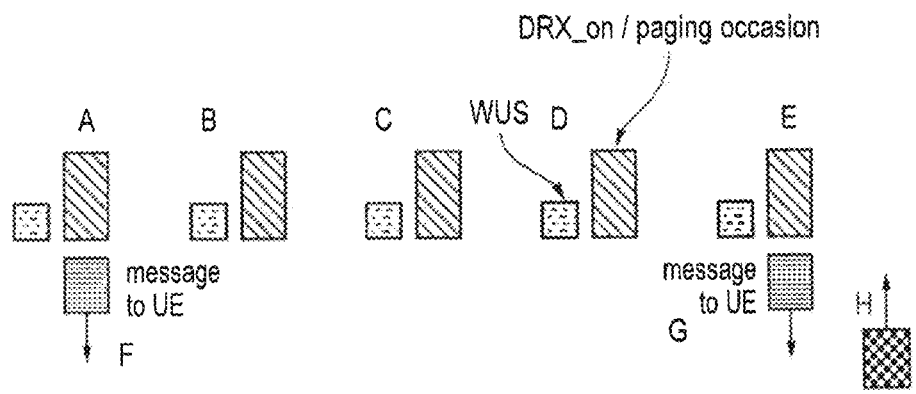
FIG. 13 shows a third example of WUS operation in accordance with embodiments of the present technique.

Operation according to these embodiments is shown in FIG. 13 and described below, in relation to points A to H:

A: During paging occasions, the eNodeB sends a message to the UE (labelled F)
UE and eNodeB reset their WUS counters to zero B, C, D: eNodeB sends WUSs and UE receives WUSs. Although the UE is woken up, it does not receive a paging message.

D: UE WUS counter=3, eNodeB WUS counter=3

E: During paging occasion, the eNodeB sends a message to the UE (labelled G)
UE and eNodeB reset their WUS counters to zero H: UE sends a response message to the network (e.g. a paging response message). In this response message, the UE can include a bit indicating whether the eNodeB WUS counter transmitted in G differs to the UE WUS counter.

As an alternative (in FIG. 13), the eNodeB does not need to transmit an indication of its WUS counter in message G, but the UE sends an indication of its WUS counter at H. The eNodeB can then compare its WUS counter to the WUS counter from the UE. If there is a discrepancy, the eNodeB can take remedial action. The messages F and G are not required to be transmitted periodically; but the UE simply counts the number of WUSs received between F and G.

In other words, in these embodiments of the present technique, the controller is configured to control the transceiver to transmit the third signal to the infrastructure equipment, the third signal indicating the number of second signals received by the transceiver. The controller is configured to control the transceiver to receive a fourth signal from the infrastructure equipment indicating that a discrepancy in the number of second signals received by the transceiver and the number of second signals transmitted by the infrastructure equipment has been determined, the fourth signal being transmitted by the infrastructure equipment in response to the infrastructure equipment comparing the number of second signals transmitted by the infrastructure equipment with the number of second signals received by the transceiver as indicated by the third signal and determining that there is a discrepancy, and the predetermined action comprises controlling the transceiver to attempt to receive a first signal from the infrastructure equipment or to transmit a first signal to the infrastructure equipment during each of the plurality of predetermined time periods.

The plurality of time periods occur periodically at a first periodic frequency, and the controller is configured to control the transceiver to transmit the third signal during ones of the plurality of time periods at a second periodic frequency, the second periodic frequency being less than the first periodic frequency. Alternatively, the plurality of time periods occur periodically at a first periodic frequency, and the controller is configured to control the transceiver to attempt to receive the first signal during ones of the plurality of time periods at a third periodic frequency, the third periodic frequency being less than the first periodic frequency.

In some of these embodiments, a first signal received by the transceiver from the infrastructure equipment during one of the plurality of predetermined time periods comprises a fifth signal, the fifth signal indicating that the transceiver should transmit the third signal to the infrastructure equipment, and the controller is configured, in response to the transceiver receiving the fifth signal, to control the transceiver to transmit the third signal to the infrastructure equipment.

In some embodiments of the present technique, the WUS signal toggles between two WUS signals (WUS1, WUS2) every time it is transmitted. The UE decodes for both WUS signals. If the UE does not notice toggling, it can ask for remedial action to be taken.

Figure 14:
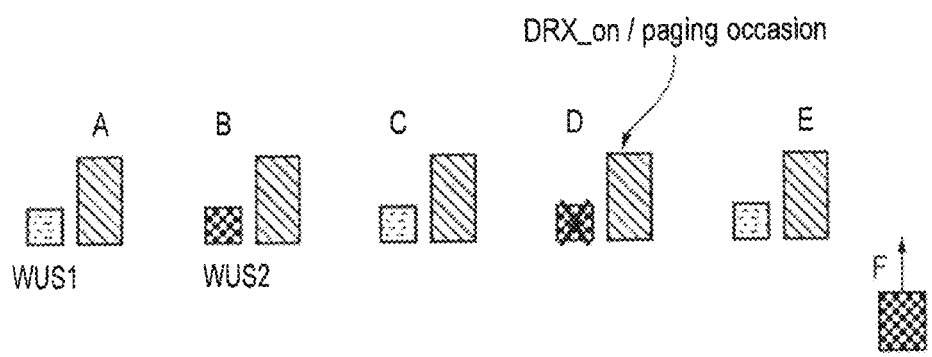
FIG. 14 shows a fourth example of WUS operation, with toggling WUS signals, in accordance with embodiments of the present technique.

Operation according to these embodiments is illustrated in FIG. 14 and is described below, in relation to points A to F:
  A: eNodeB transmits WUS1, UE receives WUS1
  B: eNodeB transmits WUS2, UE receives WUS2
  C: eNodeB transmits WUS1, UE receives WUS1
  D: eNodeB transmits WUS2, UE does not receive WUS
  E: eNodeB transmits WUS1, UE receives WUS1
  F: UE observes that it received the same WUS twice in succession (i.e. WUS did not toggle).

The UE hence determines that it missed reception of a WUS and transmits a discrepancy report to the eNodeB.

Operation according to such embodiments has been described in terms of a simple toggle between two WUSs (WUS1 and WUS2). It is appreciated that there are cases where multiple WUSs can be missed by the UE (e.g. due to poor channel conditions or a security attack). In such cases, the UE may not notice a toggle of the two WUSs. For example, the following case leads to the UE not noticing that it is missing WUS, since it notices a toggle between A and D, but did not notice the toggle at B and C:
  A: eNodeB transmits WUS1. UE receives WUS1
  B: eNodeB transmits WUS2. UE does not receive WUS
  C: eNodeB transmits WUS1. UE does not receive WUS
  D: eNodeB transmits WUS2. UE receives WUS2

This issue can be alleviated by rotating the WUS signal between a larger number of candidate WUSs (e.g. rotating between 4 WUSs). With reference to the above example, the following WUS signaling sequence leads to the UE observing a WUS reliability error, since at D the UE observes the WUS signal transitioning from WUS1 to WUS4 (instead of WUS1 to WUS2).
  A: eNodeB transmits WUS1. UE receives WUS1
  B: eNodeB transmits WUS2. UE does not receive WUS
  C: eNodeB transmits WUS3. UE does not receive WUS
  D: eNodeB transmits WUS4. UE receives WUS4

In other words, in these embodiments of the present technique, each of a plurality of consecutive second signals transmitted by the infrastructure equipment comprises a respective predetermined characteristic, the predetermined characteristics of any two consecutively transmitted second signals being different to each other and the predetermined characteristics being repeated for the plurality of consecutively transmitted second signals in a predetermined pattern, the characteristic associated with the plurality of second signals is the repeated predetermined pattern of the predetermined characteristics for a plurality of consecutive second signals received by the transceiver, and the predetermined condition is that there is a discrepancy between a predetermined characteristic of one of the plurality of consecutively received second signals and an expected characteristic of the one of the plurality of consecutively received second signals in accordance with the repeated predetermined pattern.

When it is determined that there is a discrepancy between a predetermined characteristic of one of the plurality of consecutively received second signals and an expected characteristic of the one of the plurality of consecutively received second signals in accordance with the repeated predetermined pattern, the predetermined action comprises controlling the transceiver to transmit a fourth signal to the infrastructure equipment, the fourth signal indicating that a discrepancy has been detected. When it is determined that there is a discrepancy between a predetermined characteristic of one of the plurality of consecutively received second signals and an expected characteristic of the one of the plurality of consecutively received second signals in accordance with the repeated predetermined pattern, the predetermined action comprises controlling the transceiver to attempt to receive a first signal from the infrastructure equipment or to transmit a first signal to the infrastructure equipment during each of the plurality of predetermined time periods.

In some embodiments of the present technique, the controller is configured to reset a count of the one or more second signals in response to the reception or the transmission of the third signal.

In some embodiments of the present technique, the UE determines that there is a problem with WUS reliability using one or more of the above described operations, but the discrepancy report is not triggered by the UE observing a discrepancy.

This discrepancy report can be based on existing an MDT (minimization of drive tests) or SON (Self organizing Networks) RLF-report (radio link failure report) framework whereby UE logs the event and in this case UE logs the number of instances where the WUS signal did not toggle. When the UE connects to the network, it indicates the presence of such a report to the network in RRC: Connection setup or re-establishment message. The eNodeB will then ask for a complete report to be sent using RRC: UE information Request/Response messages and these messages are exchanged only after security has been activated. The drawback of this approach is that remedial action is not immediate, but after a certain time depending on the reporting interval or when a particular UE moves to connected mode. However, it will allow the network to figure out broadly the reliability issues. The UE reports its location as well so it will help the network to understand if the issue is related to transmission reliability if many UEs from the same area are reporting the same problem (of missing WUSs). The eNodeB's action, in terms of disabling WUSs or changing the configuration, will commence after a certain time e.g. 30 minutes or so, and the mechanism can not be used for subframe to subframe remedial action.

It should be appreciated that the above described MDT mechanism can be equally applied to any of the above described embodiments as a reporting mechanism. UE logging can be based on such individual embodiments as explained above.

Remedial Actions

If there is a discrepancy between the number of WUSs received by the UE and the number transmitted by the eNodeB, the eNodeB can take one of the following remedial actions:

Disable the use of WUSs for the UEs that are affected. In this case, those UEs would wake up at every paging occasion/DRX_on time until WUSs are reactivated.

Change the configuration of the WUS. For example:
increase transmit power of the WUS
increase the physical resources applied to WUSs
increase the preamble length of the WUS
increase the number of repetitions applied to WUSs Alternatively, the UE can take its own remedial action, without intervention by the eNodeB. For example, the UE stops listening to the WUS signal and always wakes up at the DRX_on/paging occasions. The next time that the UE contacts the network (e.g. responds to paging or transmits an MO message), the UE can transmit its WUS receiver status to the eNodeB and the eNodeB can decide whether to take remedial action.

The claims and above embodiments refer to first to fifth signals, which are also described above in terms of the following. The first signal refers to, for example, any sort of a data exchange between the UE and eNodeB (which could, for example, include or be a paging message, or a PDCCH that indicates there is going to be paging) at a time at which the UE has woken up in response to a WUS. The second signal refers to a WUS itself. The third signal is, for example, a message indicating the WUS count at either the UE or the eNodeB, depending on which entity is performing the comparison. The fourth signal refers to, for example, a report of a discrepancy in this comparison, i.e. when the UE and eNodeB have counted a different number of WUSs. The fifth signal relates to the embodiment described in relation to FIG. 13 (and in particular, message G therein). This could also be a paging message, or any message sent during a time period at which the UE has been woken up anyway.

Embodiments of the present technique may therefore provide ways in which WUSs, which allow for the reduction of power consumption at low power devices (for example efeMTC and feNB-IoT devices), can mitigate issues relating to reliability of communication (paging messages and other messages that are controlled by the WUSs) between a network and a UE.

Those skilled in the art would appreciate that, although the embodiments of the present technique have been described broadly in respect of LTE, they could be equally applied to other wireless telecommunications systems and networks, such Radio Access Technologies (RAT)s such as 5G, also termed NR or new RAT.

Equally, those skilled in the art would appreciate that, although the above described embodiments of the present technique have been described broadly in view of the operation of a terminal device for use with a wireless telecommunications system, they could equally and/or correspondingly be applied to an infrastructure equipment for use with a wireless telecommunications system, or to a wireless telecommunications system, as reflected in the following numbered paragraphs and the appended claims.

The following numbered paragraphs provide further example aspects and features of the present technique:

Paragraph 1. A terminal device for use with a wireless telecommunications system, the terminal device comprising a transceiver and a controller, wherein:

the controller is configured:
to control the transceiver to attempt to receive a first signal from infrastructure equipment of the wireless telecommunications system or to transmit a first signal to the infrastructure equipment during one or more of a plurality of predetermined time periods, the controller being configured to control the transceiver to attempt to receive or to transmit a first signal during the one or more of the plurality of predetermined time periods in response to determining that one or more second signals indicating, respectively, that the one or more of the plurality of predetermined time periods should be used for the attempted reception or transmission of a first signal have been received by the transceiver;
to determine a characteristic associated with the one or more second signals; and
to control the transceiver to receive a third signal from the infrastructure equipment or to transmit a third signal to the infrastructure equipment, the third signal comprising information on the basis of which it is determinable whether or not a predetermined condition associated with the characteristic associated with the one or more second signals has been met, the predetermined condition having been met indicating a discrepancy in the number of second signals transmitted by the infrastructure equipment and the number of second signals received by the terminal device.

Paragraph 2. A terminal device according to Paragraph 1, wherein
when the predetermined condition is determined to have been met, the controller is configured to take a predetermined action in response to the discrepancy in the number of second signals transmitted by the infrastructure equipment and the number of second signals received by the terminal device.

Paragraph 3. A terminal device according to Paragraph 1, wherein the third signal is a minimisation of drive tests, MDT, report, from which it is determinable whether or not the predetermined condition has been met for a plurality of counts of the second signals.

Paragraph 4. A terminal device according to Paragraph 1, wherein the controller is configured to control the transceiver to transmit a discrepancy message to the infrastructure equipment.

Paragraph 5. A terminal device according to Paragraph 4, wherein the controller is configured to control the transceiver to transmit the discrepancy message as part of a minimisation of drive tests, MDT, report.

Paragraph 6. A terminal device according to Paragraph 4, wherein the controller is configured to control the transceiver to transmit the discrepancy message in response to receiving, by the transceiver, a paging message from the infrastructure equipment, the paging message instructing the terminal device to transmit the discrepancy message.

Paragraph 7. A terminal device according to Paragraph 4, wherein the controller is configured to control the transceiver to transmit the discrepancy message in response to determining that the discrepancy in the number of second signals transmitted by the infrastructure equipment and the number of second signals received by the terminal device has occurred.

Paragraph 8. A terminal device according to any of Paragraphs 1 to 7, wherein the controller is configured to control the transceiver to receive or transmit the third signal from or to the infrastructure equipment in response to the determination of the characteristic associated with the one or more second signals.

Paragraph 9. A terminal device according to any of Paragraphs 1 to 7, wherein the characteristic associated with the one or more second signals is the number of second signals received by the transceiver and the predetermined condition is that there is a discrepancy in the number of second signals received by the transceiver and the number of second signals transmitted by the infrastructure equipment.

Paragraph 10. A terminal device according to Paragraph 9, wherein the controller is configured:
 to control the transceiver to receive the third signal from the infrastructure equipment, the third signal indicating the number of second signals transmitted by the infrastructure equipment; and
 to compare the number of second signals received by the transceiver with the number of second signals transmitted by the infrastructure equipment as indicated by the third signal in order to determine whether there is a discrepancy in the number of second signals received by the transceiver and the number of second signals transmitted by the infrastructure equipment.

Paragraph 11. A terminal device according to Paragraph 10, wherein, when it is determined that there is a discrepancy in the number of second signals received by the transceiver and the number of second signals transmitted by the infrastructure equipment, the predetermined action comprises controlling the transceiver to transmit a fourth signal to the infrastructure equipment, the fourth signal indicating that a discrepancy has been detected.

Paragraph 12. A terminal device according to Paragraph 10 or 11, wherein, when it is determined that there is a discrepancy in the number of second signals received by the transceiver and the number of second signals transmitted by the infrastructure equipment, the predetermined action comprises controlling the transceiver to attempt to receive a first signal from the infrastructure equipment or to transmit a first signal to the infrastructure equipment during each of the plurality of predetermined time periods.

Paragraph 13. A terminal device according to any one of Paragraphs 10 to 12, wherein:
 the plurality of time periods occur periodically at a first periodic frequency; and
 the controller is configured to control the transceiver to attempt to receive the third signal during ones of the plurality of time periods at a second periodic frequency, the second periodic frequency being less than the first periodic frequency.

Paragraph 14. A terminal device according to any one of Paragraphs 10 to 12, wherein:
 the plurality of time periods occur periodically at a first periodic frequency; and
 the controller is configured to control the transceiver to attempt to receive the first signal during ones of the plurality of time periods at a third periodic frequency, the third periodic frequency being less than the first periodic frequency.

Paragraph 15. A terminal device according to any one of Paragraphs 10 to 12, wherein a first signal received by the transceiver from the infrastructure equipment during one of the plurality of predetermined time periods comprises the third signal.

Paragraph 16. A terminal device according to any of Paragraphs 9 to 15, wherein the controller is configured to control the transceiver to transmit the third signal to the infrastructure equipment, the third signal indicating the number of second signals received by the transceiver.

Paragraph 17. A terminal device according to Paragraph 16, wherein:
 the controller is configured to control the transceiver to receive a fourth signal from the infrastructure equipment indicating that a discrepancy in the number of second signals received by the transceiver and the number of second signals transmitted by the infrastructure equipment has been determined, the fourth signal being transmitted by the infrastructure equipment in response to the infrastructure equipment comparing the number of second signals transmitted by the infrastructure equipment with the number of second signals received by the transceiver as indicated by the third signal and determining that there is a discrepancy; and
 the predetermined action comprises controlling the transceiver to attempt to receive a first signal from the infrastructure equipment or to transmit a first signal to the infrastructure equipment during each of the plurality of predetermined time periods.

Paragraph 18. A terminal device according to Paragraph 16 or 17, wherein:
 the plurality of time periods occur periodically at a first periodic frequency; and
 the controller is configured to control the transceiver to transmit the third signal during ones of the plurality of time periods at a second periodic frequency, the second periodic frequency being less than the first periodic frequency.

Paragraph 19. A terminal device according to Paragraph 16 or 17, wherein:
 the plurality of time periods occur periodically at a first periodic frequency; and
 the controller is configured to control the transceiver to attempt to receive the first signal during ones of the plurality of time periods at a third periodic frequency, the third periodic frequency being less than the first periodic frequency.

Paragraph 20. A terminal device according to Paragraph 16 or 17, wherein:
 a first signal received by the transceiver from the infrastructure equipment during one of the plurality of predetermined time periods comprises a fifth signal, the fifth signal indicating that the transceiver should transmit the third signal to the infrastructure equipment; and
 the controller is configured, in response to the transceiver receiving the fifth signal, to control the transceiver to transmit the third signal to the infrastructure equipment.

Paragraph 21. A terminal device according to any of Paragraphs 1 to 20, wherein:
 each of a plurality of consecutive second signals transmitted by the infrastructure equipment comprises a respective predetermined characteristic, the predetermined characteristics of any two consecutively transmitted second signals being different to each other and the predetermined characteristics being repeated for the plurality of consecutively transmitted second signals in a predetermined pattern;
 the characteristic associated with the plurality of second signals is the repeated predetermined pattern of the predetermined characteristics for a plurality of consecutive second signals received by the transceiver; and
 the predetermined condition is that there is a discrepancy between a predetermined characteristic of one of the plurality of consecutively received second signals and an expected characteristic of the one of the plurality of consecutively received second signals in accordance with the repeated predetermined pattern.

Paragraph 22. A terminal device according to Paragraph 21, wherein, when it is determined that there is a discrepancy between a predetermined characteristic of one of the plurality of consecutively received second signals and an expected characteristic of the one of the plurality of consecutively received second signals in accordance with the repeated predetermined pattern, the predetermined action comprises controlling the transceiver to transmit a fourth signal to the infrastructure equipment, the fourth signal indicating that a discrepancy has been detected.

Paragraph 23. A terminal device according to Paragraph 21 or 22, wherein, when it is determined that there is a discrepancy between a predetermined characteristic of one of the plurality of consecutively received second signals and an expected characteristic of the one of the plurality of consecutively received second signals in accordance with the repeated predetermined pattern, the predetermined action comprises controlling the transceiver to attempt to receive a first signal from the infrastructure equipment or to transmit a first signal to the infrastructure equipment during each of the plurality of predetermined time periods.

Paragraph 24. A terminal device according to any of Paragraphs 1 to 23, wherein the controller is configured to reset a count of the one or more second signals in response to the reception or the transmission of the third signal.

Paragraph 25. An infrastructure equipment for use with a wireless telecommunications system, the infrastructure equipment comprising a transceiver and a controller, wherein:
the controller is configured:
to control the transceiver to attempt to receive a first signal from a terminal device of the wireless telecommunications system or to transmit a first signal to the terminal device during one or more of a plurality of predetermined time periods, the controller being configured to control the transceiver to attempt to receive or to transmit a first signal during the one or more of the plurality of predetermined time periods in response to transmitting one or more second signals to the terminal device indicating, respectively, that the one or more of the plurality of predetermined time periods should be used for the attempted reception or transmission of a first signal; and
to control the transceiver to receive a third signal from the terminal device or to transmit a third signal to the terminal device, the third signal comprising information on the basis of which it is determinable whether or a not a predetermined condition associated with a characteristic associated with the one or more second signals has been met, the predetermined condition having been met indicating a discrepancy in the number of second signals transmitted by the transceiver and the number of second signals received by the terminal device.

Paragraph 26. An infrastructure equipment according to Paragraph 25, wherein the characteristic associated with the one or more second signals is the number of second signals transmitted by the transceiver and the predetermined condition is that there is a discrepancy in the number of second signals transmitted by the transceiver and the number of second signals received by the terminal device.

Paragraph 27. An infrastructure equipment according to Paragraph 26, wherein the controller is configured:

to control the transceiver to receive the third signal from the terminal device, the third signal indicating the number of second signals received by the terminal device;
to compare the number of second signals transmitted by the transceiver with the number of second signals received by the terminal device as indicated by the third signal in order to determine whether there is a discrepancy in the number of second signals transmitted by the transceiver and the number of second signals received by the terminal device.

Paragraph 28. An infrastructure equipment according to Paragraph 27, wherein, when it is determined that there is a discrepancy in the number of second signals transmitted by the transceiver and the number of second signals received by the terminal device, the controller is configured to control the transceiver to transmit a fourth signal to the terminal device, the fourth signal indicating that a discrepancy has been detected.

Paragraph 29. An infrastructure equipment according to Paragraph 27 or 28, wherein:
the plurality of time periods occur periodically at a first periodic frequency; and
the controller is configured to control the transceiver to attempt to receive the third signal during ones of the plurality of time periods at a second periodic frequency, the second periodic frequency being less than the first periodic frequency.

Paragraph 30. An infrastructure equipment according to Paragraph 27 or 28, wherein:
the plurality of time periods occur periodically at a first periodic frequency; and
the controller is configured to control the transceiver to attempt to receive the first signal during ones of the plurality of time periods at a third periodic frequency, the third periodic frequency being less than the first periodic frequency.

Paragraph 31. An infrastructure equipment according to any of Paragraphs 26 to 30, wherein the controller is configured to control the transceiver to transmit the third signal to the terminal device, the third signal indicating the number of second signals transmitted by the transceiver.

Paragraph 32. An infrastructure equipment according to Paragraph 31, wherein:
the controller is configured to control the transceiver to receive a fourth signal from the terminal device indicating that a discrepancy in the number of second signals received by the terminal device and the number of second signals transmitted by the transceiver has been determined, the fourth signal being transmitted by the terminal device in response to the terminal device comparing the number of second signals received by the terminal device with the number of second signals transmitted by the transceiver as indicated by the third signal and determining that there is a discrepancy.

Paragraph 33. An infrastructure equipment according to Paragraph 31 or 32, wherein:
the plurality of time periods occur periodically at a first periodic frequency; and
the controller is configured to control the transceiver to transmit the third signal during ones of the plurality of time periods at a second periodic frequency, the second periodic frequency being less than the first periodic frequency.

Paragraph 34. An infrastructure equipment according to Paragraph 31 or 32, wherein:

the plurality of time periods occur periodically at a first periodic frequency; and the controller is configured to control the transceiver to transmit the first signal during ones of the plurality of time periods at a third periodic frequency, the third periodic frequency being less than the first periodic frequency.

Paragraph 35. An infrastructure equipment according to Paragraph 31 or 32, wherein:

a first signal transmitted by the transceiver to the terminal device during one of the plurality of predetermined time periods comprises a fifth signal, the fifth signal indicating that the terminal device should transmit the third signal to the infrastructure equipment; and the controller is configured, in response to the transceiver transmitting the fifth signal, to control the transceiver to receive the third signal from the terminal device.

Paragraph 36. An infrastructure equipment according to any of Paragraphs 25 to 35, wherein:

each of a plurality of consecutive second signals transmitted by the transceiver comprises a respective predetermined characteristic, the predetermined characteristics of any two consecutively transmitted second signals being different to each other and the predetermined characteristics being repeated for the plurality of consecutively transmitted second signals in a predetermined pattern;

the characteristic associated with the plurality of second signals is the repeated predetermined pattern of the predetermined characteristics for a plurality of consecutive second signals received by the terminal device; and the predetermined condition is that there is a discrepancy between a predetermined characteristic of one of the plurality of consecutive second signals received by the terminal device and an expected characteristic of the one of the plurality of consecutive second signals received by the terminal device in accordance with the repeated predetermined pattern.

Paragraph 37. An infrastructure equipment according to Paragraph 36, wherein the controller is configured to control the transceiver to receive a fourth signal from the terminal device, the fourth signal being transmitted by the terminal device when it is determined that there is a discrepancy between a predetermined characteristic of one of the plurality of consecutively received second signals and an expected characteristic of the one of the plurality of consecutively received second signals in accordance with the repeated predetermined pattern, the fourth signal indicating that a discrepancy has been detected.

Paragraph 38. A wireless telecommunications system comprising a terminal device and an infrastructure equipment, wherein the terminal device is configured:

to attempt to receive a first signal from infrastructure equipment of the wireless telecommunications system or to transmit a first signal to the infrastructure equipment during one or more of a plurality of predetermined time periods, the terminal device being configured to attempt to receive or to transmit a first signal during the one or more of the plurality of predetermined time periods in response to determining that one or more second signals indicating, respectively, that the one or more of the plurality of predetermined time periods should be used for the attempted reception or transmission of a first signal have been received by the terminal device;

to determine a characteristic associated with the one or more second signals; and to receive a third signal from the infrastructure equipment or to transmit a third signal to the infrastructure equipment, the third signal comprising information on the basis of which it is determinable whether or not a predetermined condition associated with the characteristic associated with the one or more second signals has been met, the predetermined condition having been met indicating a discrepancy in the number of second signals transmitted by the infrastructure equipment and the number of second signals received by the terminal device.

Paragraph 39. A method of operating a terminal device for use with a wireless telecommunications system, the terminal device, the method comprising:

attempting to receive a first signal from infrastructure equipment of the wireless telecommunications system or to transmit a first signal to the infrastructure equipment during one or more of a plurality of predetermined time periods, wherein the attempting to receive or to transmit a first signal during the one or more of the plurality of predetermined time periods is carried out in response to determining that one or more second signals indicating, respectively, that the one or more of the plurality of predetermined time periods should be used for the attempted reception or transmission of a first signal have been received by the terminal device;

determining a characteristic associated with the one or more second signals; and receiving a third signal from the infrastructure equipment or transmitting a third signal to the infrastructure equipment, the third signal comprising information on the basis of which it is determinable whether or not a predetermined condition associated with the characteristic associated with the one or more second signals has been met, the predetermined condition having been met indicating a discrepancy in the number of second signals transmitted by the infrastructure equipment and the number of second signals received by the terminal device.

Paragraph 40. A method of operating an infrastructure equipment for use with a wireless telecommunications system, the method comprising:

attempting to receive a first signal from a terminal device of the wireless telecommunications system or to transmit a first signal to the terminal device during one or more of a plurality of predetermined time periods, wherein the attempting to receive or to transmit a first signal during the one or more of the plurality of predetermined time periods is carried out in response to transmitting one or more second signals to the terminal device indicating, respectively, that the one or more of the plurality of predetermined time periods should be used for the attempted reception or transmission of a first signal; and receiving a third signal from the terminal device or transmitting a third signal to the terminal device, the third signal comprising information on the basis of which it is determinable whether or a not a predetermined condition associated with a characteristic associated with the one or more second signals has been met, the predetermined condition having been met indicating a discrepancy in the number of second signals transmitted by the infrastructure equipment and the number of second signals received by the terminal device.

Paragraph 41. A method of operating a wireless telecommunications system comprising a terminal device and an infrastructure equipment, the method comprising, at the communications device:

attempting to receive a first signal from infrastructure equipment of the wireless telecommunications system or to transmit a first signal to the infrastructure equipment during one or more of a plurality of predetermined time periods, the terminal device being configured to attempt to receive or to transmit a first signal during the one or more of the plurality of predetermined time periods in response to determining that one or more second signals indicating, respectively, that the one or more of the plurality of predetermined time periods should be used for the attempted reception or transmission of a first signal have been received by the terminal device;

determining a characteristic associated with the one or more second signals; and receiving a third signal from the infrastructure equipment or transmitting a third signal to the infrastructure equipment, the third signal comprising information on the basis of which it is determinable whether or not a predetermined condition associated with the characteristic associated with the one or more second signals has been met, the predetermined condition having been met indicating a discrepancy in the number of second signals transmitted by the infrastructure equipment and the number of second signals received by the terminal device.

Paragraph 42. Circuitry for a terminal device for use with a wireless telecommunications system, the terminal device comprising transceiver circuitry and controller circuitry, wherein:

the controller circuitry is configured:

to control the transceiver circuitry to attempt to receive a first signal from infrastructure equipment of the wireless telecommunications system or to transmit a first signal to the infrastructure equipment during one or more of a plurality of predetermined time periods, the controller being configured to control the transceiver circuitry to attempt to receive or to transmit a first signal during the one or more of the plurality of predetermined time periods in response to determining that one or more second signals indicating, respectively, that the one or more of the plurality of predetermined time periods should be used for the attempted reception or transmission of a first signal have been received by the transceiver circuitry;

to determine a characteristic associated with the one or more second signals; and to control the transceiver circuitry to receive a third signal from the infrastructure equipment or to transmit a third signal to the infrastructure equipment, the third signal comprising information on the basis of which it is determinable whether or not a predetermined condition associated with the characteristic associated with the one or more second signals has been met, the predetermined condition having been met indicating a discrepancy in the number of second signals transmitted by the infrastructure equipment and the number of second signals received by the terminal device.

Paragraph 43. Circuitry for an infrastructure equipment for use with a wireless telecommunications system, the infrastructure equipment comprising transceiver circuitry and controller circuitry, wherein:

the controller circuitry is configured:

to control the transceiver circuitry to attempt to receive a first signal from a terminal device of the wireless telecommunications system or to transmit a first signal to the terminal device during one or more of a plurality of predetermined time periods, the controller being configured to control the transceiver circuitry to attempt to receive or to transmit a first signal during the one or more of the plurality of predetermined time periods in response to transmitting one or more second signals to the terminal device indicating, respectively, that the one or more of the plurality of predetermined time periods should be used for the attempted reception or transmission of a first signal; and to control the transceiver circuitry to receive a third signal from the terminal device or to transmit a third signal to the terminal device, the third signal comprising information on the basis of which it is determinable whether or a not a predetermined condition associated with a characteristic associated with the one or more second signals has been met, the predetermined condition having been met indicating a discrepancy in the number of second signals transmitted by the transceiver circuitry and the number of second signals received by the terminal device.

Paragraph 44. Circuitry for a wireless telecommunications system comprising a terminal device and an infrastructure equipment, wherein the terminal device is configured:

to attempt to receive a first signal from infrastructure equipment of the wireless telecommunications system or to transmit a first signal to the infrastructure equipment during one or more of a plurality of predetermined time periods, the terminal device being configured to attempt to receive or to transmit a first signal during the one or more of the plurality of predetermined time periods in response to determining that one or more second signals indicating, respectively, that the one or more of the plurality of predetermined time periods should be used for the attempted reception or transmission of a first signal have been received by the terminal device;

to determine a characteristic associated with the one or more second signals; and to receive a third signal from the infrastructure equipment or to transmit a third signal to the infrastructure equipment, the third signal comprising information on the basis of which it is determinable whether or not a predetermined condition associated with the characteristic associated with the one or more second signals has been met, the predetermined condition having been met indicating a discrepancy in the number of second signals transmitted by the infrastructure equipment and the number of second signals received by the terminal device.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] RP-161321, "New WI proposal on Further Enhanced MTC", Ericsson, RAN #72.
[2] R1-166660 "Higher data rate for feMTC," Sony, RAN1 #86.
[3] LTE for UMTS: OFDMA and SC-FDMA Based Radio Access, Harris Holma and Antti Toskala, Wiley 2009, ISBN 978-0-470-99401-6.
[4] "Paging in LTE," [Online], Available at: http://lteinwireless.blogspot.co.uk/2012/12/paging-in-lte.html, November 2012.
[5] RP-161464, "Revised WID for Further Enhanced MTC for LTE," Ericsson, RAN #73.
[6] RP-161901, "Revised work item proposal: Enhancements of NB-IoT", Huawei, HiSilicon, RAN #73.
[7] RP-170732, "New WID on Even further enhanced MTC for LTE," Ericsson, Qualcomm, RAN #75.
[8] RP-170852, "New WID on Further NB-IoT enhancements," Huawei, HiSilicon, Neul, RAN #75.

ANNEX 1

As shown in FIG. 4, each LTE uplink sub-frame may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks.

As well as physical uplink channels, uplink sub-frames may also include reference signals. For example, demodulation reference signals (DMRS) 307 and sounding reference signals (SRS) 308 may be present in an uplink sub-frame where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [3].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 309 and lower 310 subcarriers/frequencies/resource blocks of an uplink sub-frame are reserved for control signaling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made contiguous frequency allocations for each UE are preferable.

What is claimed is:

1. A method of operating an infrastructure equipment for use with a wireless telecommunications system, the method comprising:

attempting to transmit a first signal to a terminal device of the wireless telecommunications system during one or more of a plurality of predetermined time periods, wherein the attempting to transmit a first signal during the one or more of the plurality of predetermined time periods is carried out in response to transmitting one or more second signals to the terminal device indicating that the one or more of the plurality of predetermined time periods should be used for the attempted reception of a first signal;

receiving a third signal from the terminal device, the third signal indicating a number of second signals received by the terminal device; and comparing the number of second signals transmitted by the infrastructure equipment with the number of second signals received by the terminal device as indicated by the third signal in order to determine whether there is a discrepancy in the number of second signals transmitted by the infrastructure equipment and the number of second signals received by the terminal device.

2. The method of claim 1, wherein, in response to a determination that there is a discrepancy in the number of second signals transmitted by the infrastructure equipment and the number of second signals received by the terminal device, transmitting a fourth signal to the terminal device, the fourth signal indicating that a discrepancy has been detected.

3. The method of claim 2, wherein the plurality of time periods occur periodically at a first periodic frequency; and wherein the method further comprises
attempting to receive, at the infrastructure equipment, the third signal during ones of the plurality of time periods at a second periodic frequency, the second periodic frequency being less than the first periodic frequency.

4. The method of claim 2, wherein the plurality of time periods occur periodically at a first periodic frequency; and wherein the method further comprises
attempting to receive, at the infrastructure equipment, the first signal during ones of the plurality of time periods at a third periodic frequency, the third periodic frequency being less than the first periodic frequency.

5. The method of claim 1, further comprising:
transmitting, by the infrastructure equipment, the third signal to the terminal device, the third signal indicating the number of second signals transmitted by the transceiver.

6. The method of claim 5, further comprising:
receiving a fourth signal from the terminal device indicating that a discrepancy in the number of second signals received by the terminal device and the number of second signals transmitted by the infrastructure equipment has been determined, the fourth signal being transmitted by the terminal device in response to the terminal device comparing the number of second signals received by the terminal device with the number of second signals transmitted by the infrastructure equipment as indicated by the third signal and determining that there is a discrepancy.

7. The method of claim 6, wherein the plurality of time periods occur periodically at a first periodic frequency; and the method further comprising:
transmitting, by the infrastructure equipment, the third signal during ones of the plurality of time periods at a second periodic frequency, the second periodic frequency being less than the first periodic frequency.

8. The method of claim 6, wherein the plurality of time periods occur periodically at a first periodic frequency; and the method further comprising:
transmitting, by the infrastructure equipment, the first signal during ones of the plurality of time periods at a third periodic frequency, the third periodic frequency being less than the first periodic frequency.

9. The method of claim 6, wherein a first signal transmitted by the transceiver to the terminal device during one of the plurality of predetermined time periods comprises a fifth signal, the fifth signal indicating that the terminal device should transmit the third signal to the infrastructure equipment; and
the method further comprising:
in response to transmitting the fifth signal, receiving, by the infrastructure equipment, the third signal from the terminal device.

10. The method of claim 1, wherein
each of a plurality of consecutive second signals transmitted by the infrastructure equipment comprises a respective predetermined characteristic, the predetermined characteristics of any two consecutively transmitted second signals being different to each other and the predetermined characteristics being repeated for the plurality of consecutively transmitted second signals in a predetermined pattern; and
the characteristic associated with the plurality of second signals is the repeated predetermined pattern of the predetermined characteristics for a plurality of consecutive second signals received by the terminal device; and
the predetermined condition is that there is a discrepancy between a predetermined characteristic of one of the plurality of consecutive second signals received by the terminal device and an expected characteristic of the one of the plurality of consecutive second signals received by the terminal device in accordance with the repeated predetermined pattern.

11. The method of claim 10, further comprising:
receiving a fourth signal from the terminal device, the fourth signal being transmitted by the terminal device in response to a determination that there is a discrepancy between a predetermined characteristic of one of the plurality of consecutively received second signals and an expected characteristic of the one of the plurality of consecutively received second signals in accordance with the repeated predetermined pattern, the fourth signal indicating that a discrepancy has been detected.

12. Circuitry for a terminal device for use with a wireless telecommunications system, the terminal device comprising transceiver circuitry and controller circuitry, wherein the circuitry is configured to:
attempt to receive a first signal from infrastructure equipment of the wireless telecommunications system during one or more of a plurality of predetermined time periods in response to determining that one or more second signals indicating that the one or more of the plurality of predetermined time periods should be used for the attempted reception of a first signal have been received;
receive a third signal from the infrastructure equipment, the third signal indicating a number of second signals transmitted by the infrastructure equipment; and compare a number of second signals transmitted by the infrastructure equipment with the number of second signals received by the terminal device as indicated by the third signal in order to determine whether there is a discrepancy in the number of second signals transmitted by the infrastructure equipment and the number of second signals received by the terminal device.

13. The circuitry for the terminal device of claim 12, wherein in response to a determination that there is a discrepancy, the circuitry is configured to
take a predetermined action in response to the discrepancy in the number of second signals transmitted by the infrastructure equipment and the number of second signals received by the terminal device.

14. The circuitry for the terminal device of claim 12, wherein the third signal is a minimization of drive tests, MDT, report, from which it is determinable whether or not a predetermined condition has been met for a plurality of counts of the second signals.

15. The circuitry for the terminal device of claim 12, wherein the circuitry is further configured to
transmit a discrepancy message to the infrastructure equipment.

16. The circuitry for the terminal device of claim 15, wherein the circuitry is further configured to
transmit the discrepancy message as part of a minimization of drive tests, MDT, report.

17. The circuitry for the terminal device of claim 15, wherein the circuitry is further configured to
transmit the discrepancy message in response to receiving a paging message from the infrastructure equipment, the paging message instructing the terminal device to transmit the discrepancy message.

18. Circuitry for an infrastructure equipment for use with a wireless telecommunications system, the infrastructure equipment comprising transceiver circuitry and controller circuitry, wherein:
the controller circuitry is configured:
to control the transceiver circuitry to attempt to transmit a first signal to a terminal device of the wireless telecommunications system during one or more of a plurality of predetermined time periods, wherein the attempting to transmit a first signal during the one or more of the plurality of predetermined time periods is carried out in response to transmitting one or more second signals to the terminal device indicating that the one or more of the plurality of predetermined time periods should be used for the attempted reception of a first signal; and
to control the transceiver circuitry to receive a third signal from the terminal device, the third signal indicating a number of second signals received by the terminal device; and
compare the number of second signals transmitted by the infrastructure equipment with the number of second signals received by the terminal device as indicated by the third signal in order to determine whether there is a discrepancy in the number of second signals transmitted by the infrastructure equipment and the number of second signals received by the terminal device.

* * * * *